(12) United States Patent
Lais et al.

(10) Patent No.: US 8,521,939 B2
(45) Date of Patent: *Aug. 27, 2013

(54) INJECTION OF I/O MESSAGES

(75) Inventors: Eric N. Lais, Tillson, NY (US); Steve Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,818

(22) Filed: Apr. 16, 2012

(65) Prior Publication Data
US 2012/0203939 A1 Aug. 9, 2012

Related U.S. Application Data

(63) Continuation of application No. 12/850,040, filed on Aug. 4, 2010.

(51) Int. Cl.
*G06F 13/36* (2006.01)

(52) U.S. Cl.
USPC ............ 710/311; 710/306; 710/308; 710/312

(58) Field of Classification Search
USPC .................................. 710/306–315, 100, 305
See application file for complete search history.

(56) References Cited

U.S. PATENT DOCUMENTS

| | | | | |
|---|---|---|---|---|
| 5,974,538 A * | 10/1999 | Wilmot, II | ...... | 712/218 |
| 6,108,739 A * | 8/2000 | James et al. | ...... | 710/113 |
| 6,263,393 B1 * | 7/2001 | Funaya et al. | ...... | 710/316 |
| 6,279,065 B1 * | 8/2001 | Chin et al. | ...... | 710/311 |
| 6,330,631 B1 * | 12/2001 | Crosland | ...... | 710/306 |
| 6,405,276 B1 * | 6/2002 | Chen et al. | ...... | 710/310 |
| 6,510,479 B1 * | 1/2003 | Hao | ...... | 710/240 |
| 6,611,891 B1 * | 8/2003 | Hewitt et al. | ...... | 710/306 |
| 6,618,782 B1 * | 9/2003 | Gulick et al. | ...... | 710/305 |
| 6,647,453 B1 * | 11/2003 | Duncan et al. | ...... | 710/306 |
| 6,941,398 B2 | 9/2005 | Lai et al. | | |
| 6,983,339 B1 | 1/2006 | Rabe et al. | | |
| 7,136,954 B2 * | 11/2006 | Check et al. | ...... | 710/310 |
| 7,174,467 B1 * | 2/2007 | Helms et al. | ...... | 713/300 |

(Continued)

FOREIGN PATENT DOCUMENTS

| | | | |
|---|---|---|---|
| EP | 871129 A2 | * | 10/1998 |
| JP | 09073436 A | * | 3/1997 |

(Continued)

OTHER PUBLICATIONS

"PCI Local Bus Technical Summary", TechFest, 1999, retrieved from the Internet on Sep. 19, 2012 at <http://www.techfest.com/hardware/bus/pci.htm>.*

(Continued)

*Primary Examiner* — Faisal M Zaman
(74) *Attorney, Agent, or Firm* — Yudell Isidore Ng Russell PLLC

(57) ABSTRACT

A data processing system includes a processor core, a system memory coupled to the processor core, an input/output adapter (IOA), and an input/output (I/O) host bridge coupled to the processor core and to the IOA. The I/O host bridge includes a register coupled to receive I/O messages from the processor core, a buffer coupled to receive I/O messages from the IOA, and logic coupled to the register and to the buffer that services I/O messages received from the register and from the buffer.

6 Claims, 19 Drawing Sheets

(56) References Cited

U.S. PATENT DOCUMENTS

| | | | |
|---|---|---|---|
| 7,315,911 B2 | 1/2008 | Davies et al. | |
| 7,581,033 B2* | 8/2009 | Ebersole et al. | 709/250 |
| 7,660,933 B2* | 2/2010 | Wang | 710/310 |
| 8,200,875 B2 | 6/2012 | Kanaya | |
| 2003/0097514 A1* | 5/2003 | Ennis et al. | 710/306 |
| 2003/0123461 A1* | 7/2003 | Riley | 370/401 |
| 2004/0073738 A1* | 4/2004 | Kessler et al. | 710/308 |
| 2005/0041637 A1* | 2/2005 | Bialkowski et al. | 370/351 |
| 2006/0010277 A1 | 1/2006 | Arndt et al. | |
| 2008/0005383 A1* | 1/2008 | Bender et al. | 710/22 |
| 2008/0126617 A1 | 5/2008 | Brownlow et al. | |
| 2008/0126648 A1 | 5/2008 | Brownlow et al. | |
| 2008/0228932 A1* | 9/2008 | Monette et al. | 709/229 |
| 2010/0238927 A1* | 9/2010 | Jain et al. | 370/390 |
| 2011/0153893 A1 | 6/2011 | Foong et al. | |
| 2012/0036304 A1* | 2/2012 | Lais et al. | 710/311 |

FOREIGN PATENT DOCUMENTS

| | | | |
|---|---|---|---|
| JP | 11232213 A * | 8/1999 | |
| JP | 2002014878 A * | 1/2002 | |
| JP | 2002269029 A * | 9/2002 | |
| JP | 2004030161 A * | 1/2004 | |
| WO | WO 9941671 A1 * | 8/1999 | |

OTHER PUBLICATIONS

"NN84014259: Flow Control Technique for Local Networks of Interconnected Token Rings", Jan. 1, 1984, IBM, IBM Technical Disclosure Bulletin, vol. 26, Iss. 8, pp. 4259-4262.*

Chagoya-Garzon, Alexandre; Rousseau, Frederic; Petrot, Frederic; , "Multi-device Driver Synthesis Flow for Heterogeneous Hierarchical Systems," Digital System Design (DSD), 2012 15th Euromicro Conference on , pp. 389-396, Sep. 5-8, 2012.*

"IEEE Standard for High Performance Serial Bus Bridges," IEEE Std 1394.1-2004 , pp. 0_1-161, 2005.*

U.S. Appl. No. 12/850,040 entitled "Injection of I/O Messages"; Notice of Allowance dated Jan. 22, 2013.

U.S. Appl. No. 13/447,691 entitled "Determination of One or More Partitionable Endpoints Affected by an I/O Message"; Final office action dated Jan. 8, 2013.

U.S. Appl. No. 12/849,980 entitled "Determination Via an Indexed Structure of One or More Partitionable Endpoints Affected by an I/O Message"; Final office action dated Jan. 8, 2013.

U.S. Appl. No. 12/850,008 entitled "Interrupt Source Controller With Scalable State Structures"; Non-final office action dated Oct. 25, 2012.

U.S. Appl. No. 12/849,958 entitled "Determination of One or More Partitionable Endpoints Affected by an I/O Message"; Final office action dated Jan. 8, 2013.

* cited by examiner

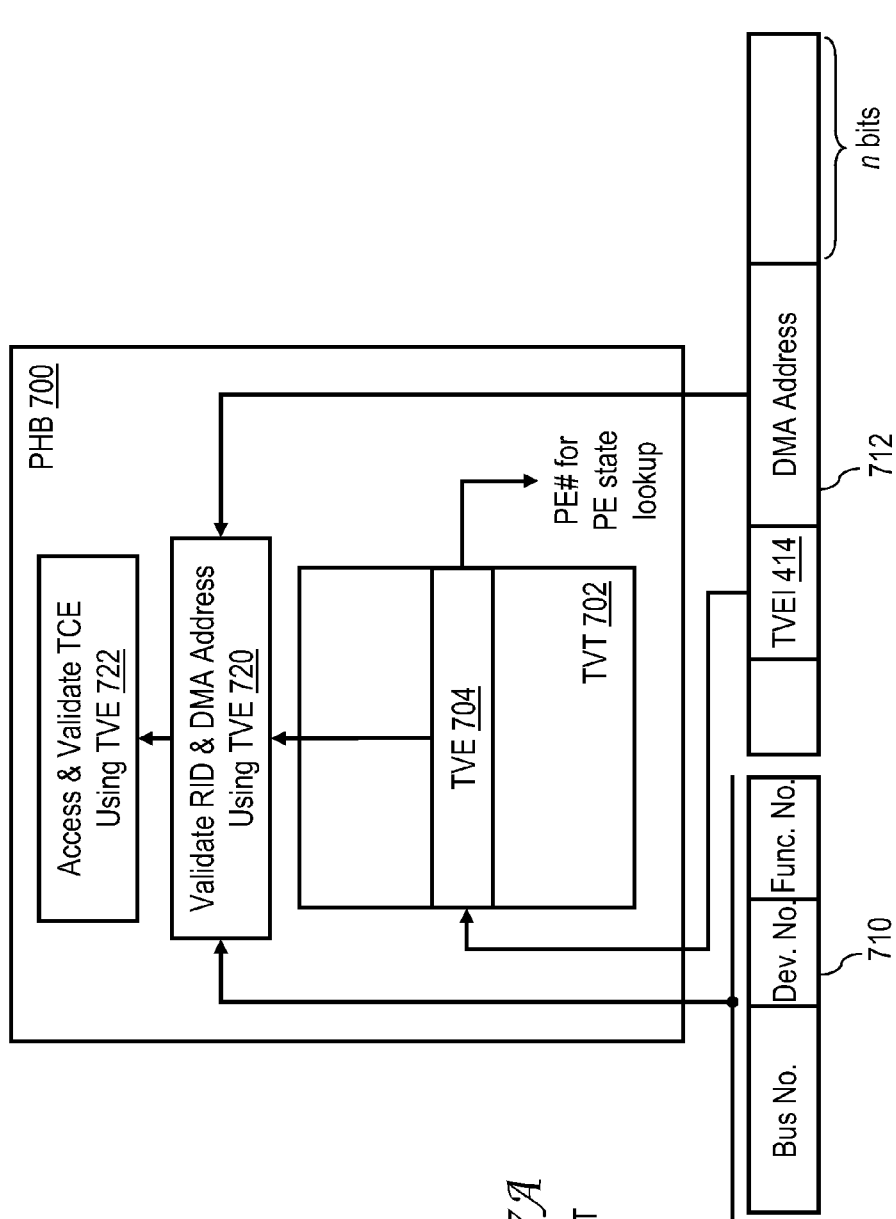
Figure 7A
PRIOR ART
Figure 7B
PRIOR ART

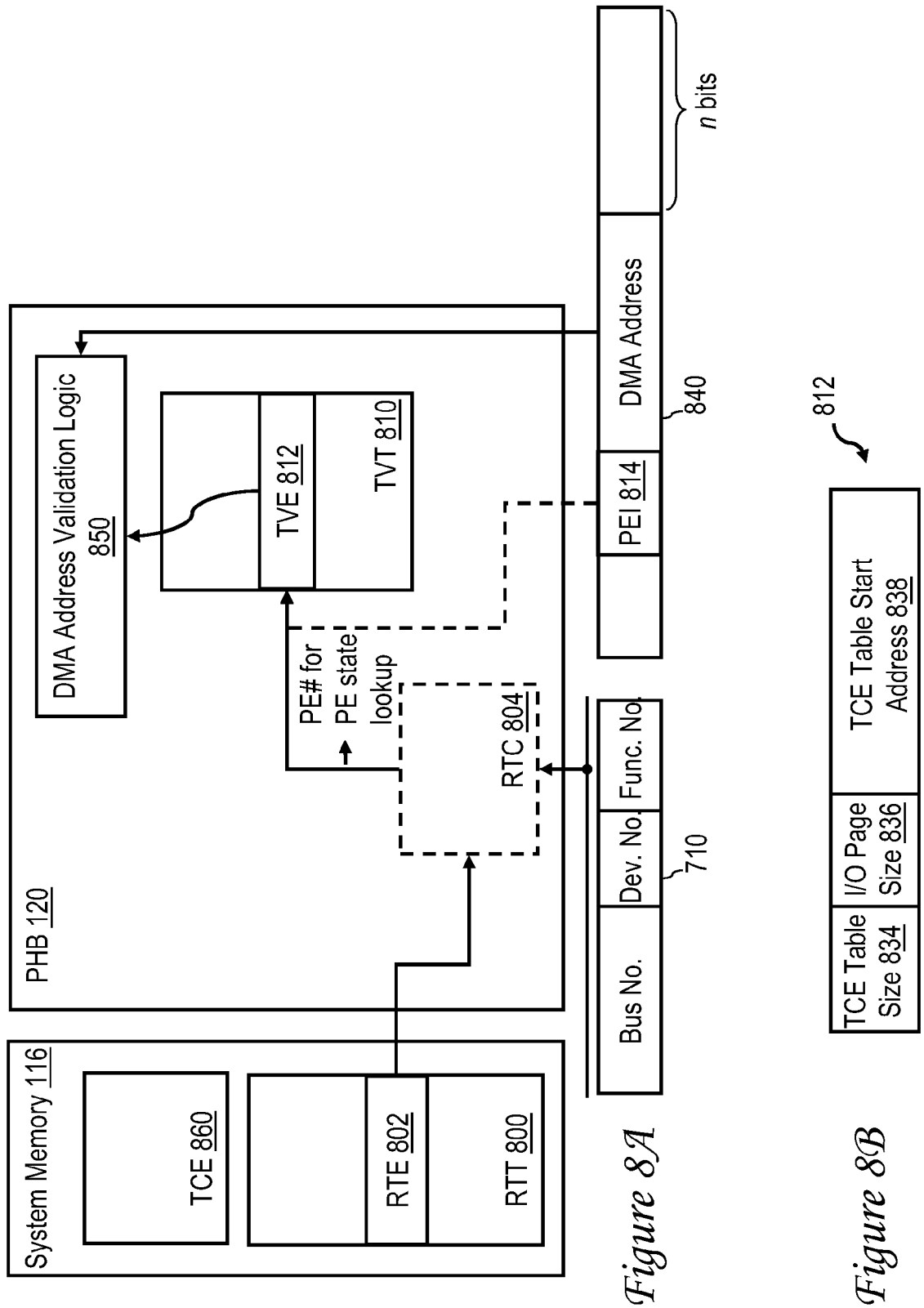

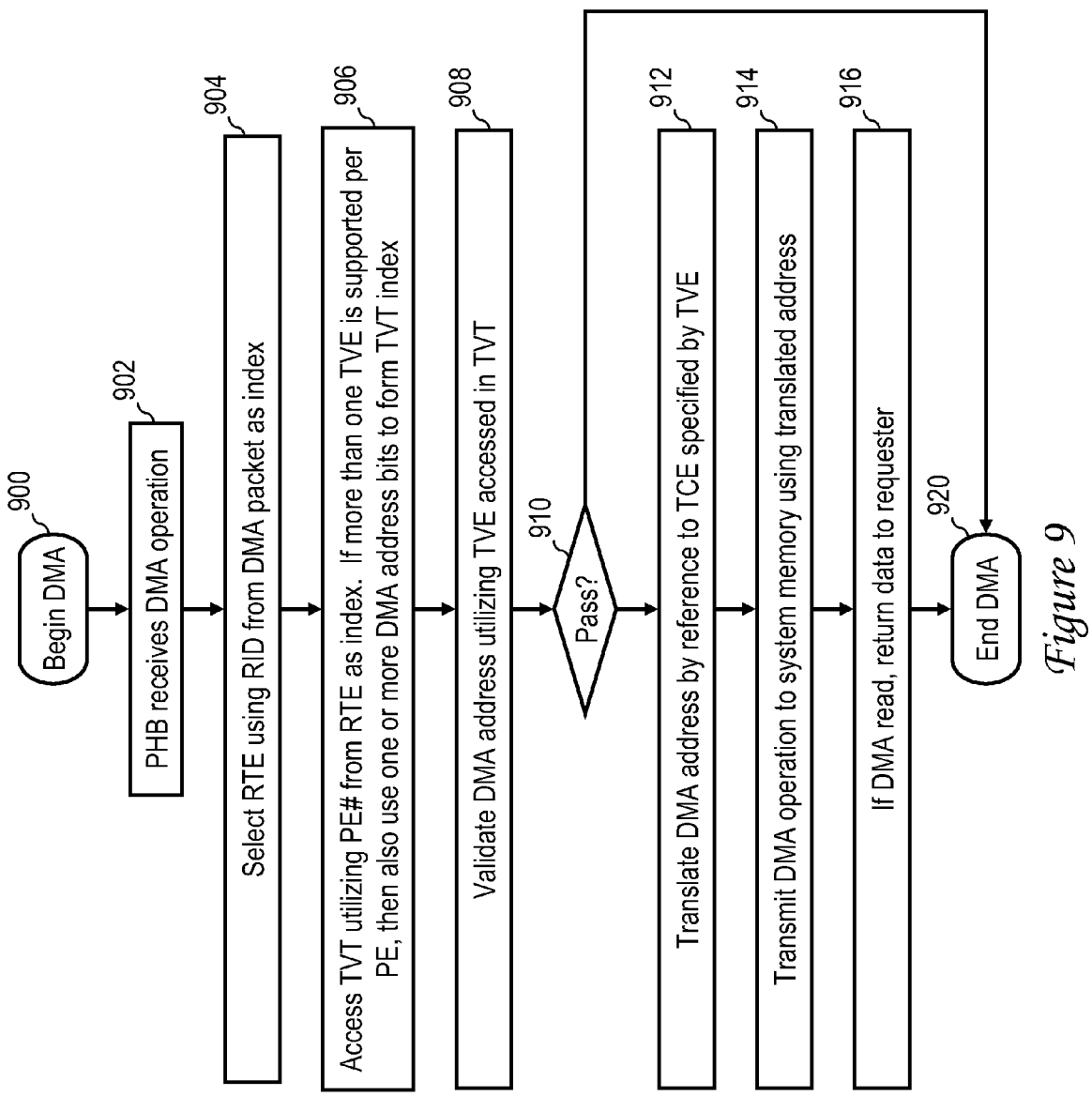

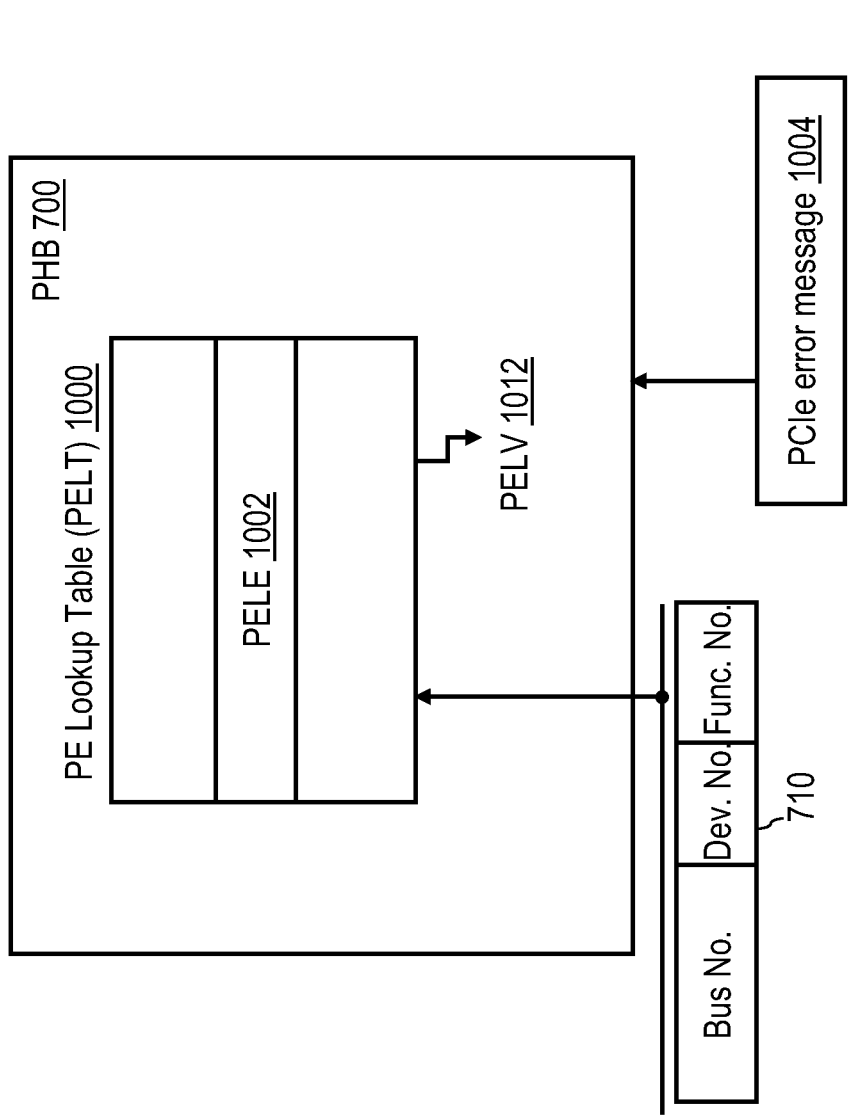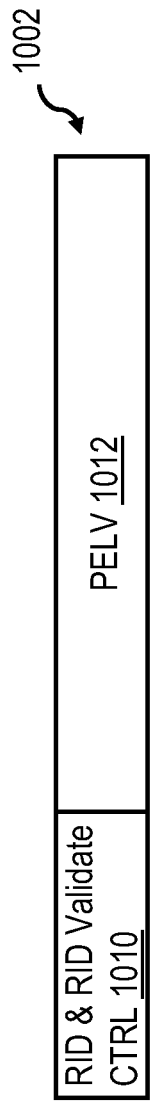
*Figure 10A*
PRIOR ART
*Figure 10B*
PRIOR ART

INJECTION OF I/O MESSAGES

This application is a continuation of U.S. patent application Ser. No. 12/850,040 entitled "INJECTION OF I/O MESSAGES" by Eric N. Lais et al. filed Aug. 4, 2010, the disclosure of which is hereby incorporated herein by reference in its entirety for all purposes.

CROSS-REFERENCE

The present application is related to the following copending patent applications, which are assigned to the assignee hereof, filed on even date herewith, and incorporated herein by reference in their entireties:
U.S. patent application Ser. No. 12/849,925;
U.S. patent application Ser. No. 12/849,958;
U.S. patent application Ser. No. 12/849,980; and
U.S. patent application Ser. No. 12/850,008.

BACKGROUND OF THE INVENTION

1. Technical Field

The present invention relates in general to data processing, and in particular, to input/output (I/O) in a data processing system.

2. Description of the Related Art

A data processing system may include multiple processing elements and multiple input/output adapters (IOAs) to support connections to communication networks, storage devices and/or storage networks, and peripheral devices. In such data processing systems, the hardware resources of the data processing system may be logically partitioned into multiple, non-intersecting sets of resources, each controlled by a respective one of multiple possibly heterogeneous operating system instances. The operating systems concurrently execute on this common hardware platform in their respective logical partitions (LPARs) under the control of system firmware, which is referred to as a virtual machine monitor (VMM) or hypervisor. Thus, the hypervisor allocates each LPAR a non-intersecting subset of the resources of the data processing system, and each operating system instance in turn directly controls its distinct set of allocable resources, such as regions of system memory and IOAs.

In any environment including multiple IOAs, it is desirable to isolate IOAs so that each IOA can only obtain access to the resources allocated to it. Isolating IOAs promotes reliability, availability and serviceability of the data processing system, and is especially important in environments supporting hardware virtualization (or logical partitioning), so that IOAs can be individually allocated to different logical partitions (LPARs) and so that any IOA errors be isolated to the particular partition to which the IOA is allocated. For example, for Peripheral Component Interconnect (PCI) buses, if an IOA in one LPAR activates the System Error (SERR) signal, the system must make the SERR signal visible to all other LPARs absent some additional control. Making I/O errors visible across LPAR boundaries requirement is, of course, contrary to the definition and intent of logical partitioning.

One solution that addresses the partitioning problem with PCI errors is to require assignment of all IOAs connected to one PCI Host Bridge (PHB) to the same LPAR partition. However, this restriction mandates a high resource granularity for IOAs that is not very useful or flexible. Ideally, IOAs should be allocable to different LPARs regardless of the PHB to which the IOA is connected. Alternative solutions include the use of specially designed bridge chips external to the PHBs as described in U.S. Pat. No. 6,643,727 or incorporating additional logic and data structures to enforce partitioning between IOAs in differing LPARs within PHBs as described in U.S. Pat. No. 7,398,427.

As also appreciated by the present disclosure, it would be desirable to reduce the size of data structures within PHBs utilized in handling routine messages, such as DMA messages, interrupt messages, and I/O error message.

SUMMARY OF THE INVENTION

In at least one embodiment, a data processing system includes a processor core, a system memory coupled to the processor core, an input/output adapter (IOA), and an input/output (I/O) host bridge coupled to the processor core and to the IOA. The I/O host bridge includes a register coupled to receive I/O messages from the processor core, a buffer coupled to receive I/O messages from the IOA, and logic coupled to the register and to the buffer that services I/O messages received from the register and from the buffer.

BRIEF DESCRIPTION OF THE DRAWINGS

FIG. 7A depicts a conventional Peripheral Component Interconnect (PCI) host bridge (PHB);

FIG. 7B illustrates a conventional Translation and Validation Entry (TVE) of a Translation and Validation Table (TVT) in the PHB of FIG. 7A;

FIG. 8A depicts an improved Peripheral Component Interconnect (PCI) host bridge (PHB) in one exemplary embodiment;

FIG. 8B illustrates an improved Translation and Validation Entry (TVE) of a Translation and Validation Table (TVT) in the PHB of FIG. 8A;

FIG. 9 is a high level logical flowchart of an exemplary process by which an I/O host bridge, such as a PHB, handles a DMA message in accordance with one embodiment;

FIG. 10A depicts a conventional Peripheral Component Interconnect (PCI) host bridge (PHB) including a PE lookup table (PELT) in accordance with the prior art;

FIG. 10B illustrates a conventional PE Lookup Entry (PELE) of the PELT in the prior art PHB of FIG. 10A;

DETAILED DESCRIPTION OF ILLUSTRATIVE EMBODIMENT

Figure 1:
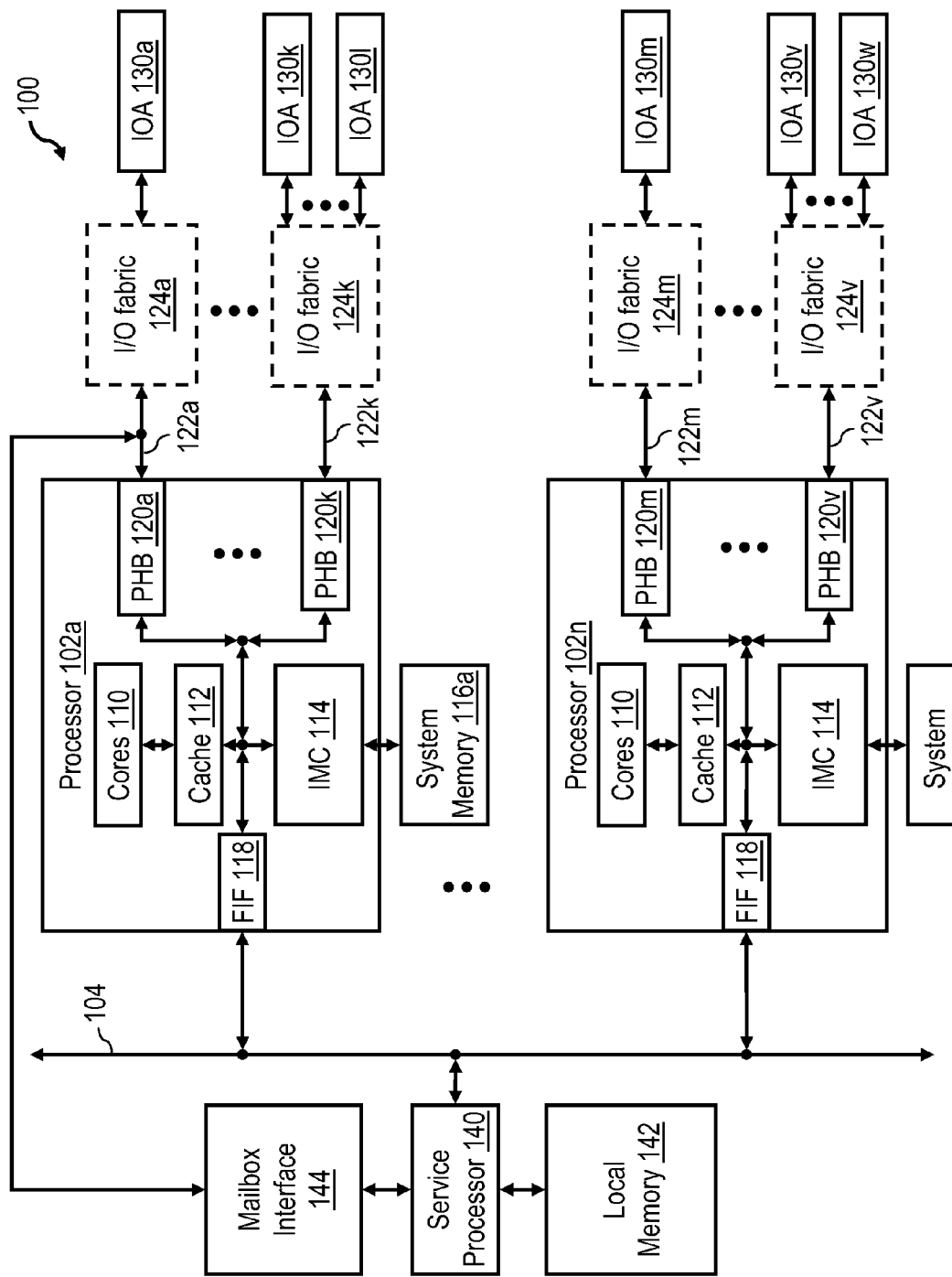
FIG. 1 is a high level block diagram of an exemplary data processing system in accordance with one embodiment.

With reference now to the figures, and in particular with reference to FIG. 1, there is depicted a high level block diagram of an exemplary data processing system 100 in accordance with one embodiment. In some embodiments, data processing system 100 may be, for example, a symmetric multiprocessor (SMP) system including a plurality of processors 102a-102n, each coupled for communication to a system fabric 104, which may include one or more bused or switched communication links. For example, data processing system 100 may be implemented with an IBM eServer, a product line of International Business Machines Corporation of Armonk, N.Y. In alternative embodiments, a data processing system with a single processor 102 may be utilized.

In the depicted embodiment, each processor 102 is preferably realized as a single integrated circuit chip having a substrate in which semiconductor circuitry is fabricated as is known in the art. As shown, processor 102 includes a plurality of processor cores 110 that process data through the execution and/or processing of program code, which may include, for example, software and/or firmware and associated data, if any. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116.

Each processor 102 further includes a fabric interface (FIF) by which processor 102 communicates with system fabric 104, as well as one or more (and preferably multiple) host bridges supporting input/output communication with various input/output adapters (IOAs) 130. In the depicted embodiment, all of the host bridges are implemented as Peripheral Component Interconnect (PCI) host bridges (PHBs) 120, but in other embodiments the host bridges may implement one or more additional or alternative I/O bus standards.

PHBs 120a, 120k, 120m and 120v provide interfaces to PCI local buses 122a, 122k, 122m and 122v, respectively, to which IOAs 130, such as network adapters, storage device controllers, peripheral adapters, etc., may be directly connected or indirectly coupled. For example, PCI IOA 130a is coupled to PCI local bus 122a optionally through an I/O fabric 124a, which may comprise one or more switches and/or bridges. In a similar manner, PCI IOAs 130k and 130l are coupled to PCI local bus 122k optionally through an I/O fabric 124k, PCI IOA 130m is coupled to PCI local bus 122m optionally through I/O fabric 124m, and PCI IOAs 130v and 130w, which may comprise, for example, a display adapter and hard disk adapter, are coupled to PCI local bus 122v optionally through I/O fabric 124v.

Data processing system 100 further includes a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM)) and non-volatile memory (e.g., non-volatile random access memory (NVRAM) or static random access memory (SRAM)). Service processor 140 is further coupled to a mailbox interface 144 through which service processor 140 communicates I/O operations with PCI bus 122a.

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed invention.

Figure 2:
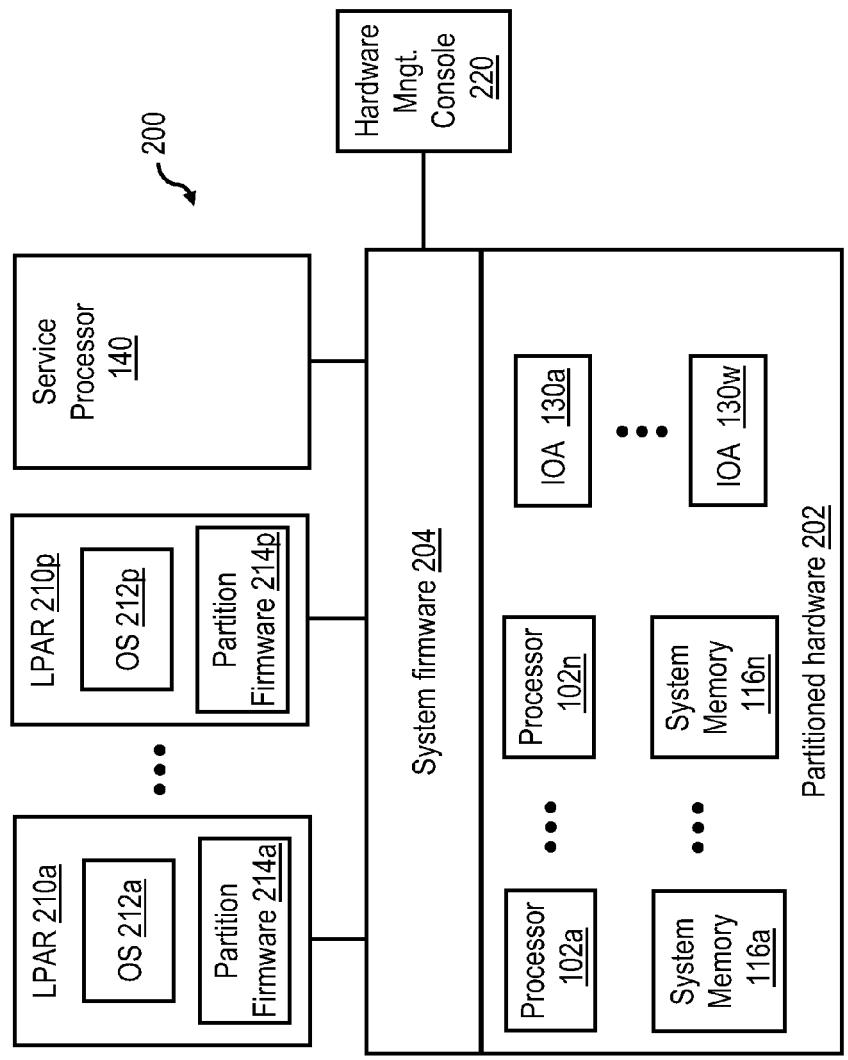
FIG. 2 is a logical view of a data processing system showing the hardware and software resources of the data processing system partitioned into multiple concurrently executing logical partitions (LPARs)

Referring now to FIG. 2, there is depicted a logical view of a data processing system 200 showing the hardware and software resources of the data processing system partitioned into multiple logical partitions (LPARs). Data processing system 200 may have, for example, the same components and/or architecture as data processing system 100 in FIG. 1 and accordingly identifies common components with like reference numerals.

Data processing system 200 has a collection of partitioned hardware 202, including processors 102a-102n, system memories 116a-116n and IOAs 130a-130w. Partitioned hardware 202 may of course include additional unillustrated components, such as additional volatile or nonvolatile storage devices, ports, bridges, switches, etc. The hardware components comprising partitioned hardware 202 (or portions thereof) can be assigned to various ones of logical partitions (LPARs) 210a-210p in data processing system 200 by system firmware 204, also referred to herein as a virtual machine monitor (VMM) or hypervisor. System firmware 204 supports the simultaneous execution of multiple independent operating system instances by virtualizing the partitioned hardware of data processing system 200.

In addition to the hardware resources allocated by system firmware 204, each of LPARs 210a-210p includes a respective one of multiple concurrently executed operating system instances 212a-212p. In various embodiments, operating system instances 212a-212p, which may include, for example, instances of Linux™, AIX™ and/or Windows™, may be homogeneous or heterogeneous. Each LPAR 210 may further include unillustrated application programs, as well as a respective instance of partition firmware 214, which may be implemented, for example, with a combination of initial boot strap code, IEEE-1275 Standard Open Firmware, and runtime abstraction software (RTAS). When LPARs 210a-210p are instantiated, a copy of boot strap code is loaded onto partitions 210a-210p by system firmware 204. Thereafter, system firmware 204 transfers control to the boot strap code, which in turn loads the open firmware and RTAS. The processor(s) 102 assigned to each LPAR 210 then execute the partition firmware 214 of that LPAR 210 to bring up the LPAR 210 and initiate execution of the OS instance 212.

In the logically partitioned environment depicted in FIG. 2, service processor 140 can be used to provide various services, such as processing of errors in LPARs 210a-210p. These services may also function as a service agent to report errors back to a system administrator or vendor of data processing system 200. Operation of the different LPARs 210 may further be controlled through a hardware management console 220. In at least one embodiment, hardware management console 220 can be implemented as a separate data processing system from which a system administrator may perform various functions within data processing system 200 including creating and destroying LPARs 210, as well as reallocating hardware and software resources among LPARs 210.

In a logical partitioned environment such as that depicted in FIG. 2, it is not permissible for the hardware or software resources in one LPAR 210 to consume the resources of or to affect the operations in another LPAR 210. Furthermore, to be useful, the assignment of resources to LPARs 210 needs to be fine-grained. For example, it is often not acceptable to assign all IOAs 130 under a particular PHB 120 to the same partition, as that will restrict configurability of the system, including the ability to dynamically reallocated resources between partitions. Accordingly, PHBs 120 are able to assign resources, such as individual IOAs 130 (or portions thereof) to different LPARs 210 while preventing the assigned resources from accessing or affecting the resources of other LPARs 210.

To support such isolation between the resources of different LPARs 210, the I/O subsystem of a data processing system is subdivided into multiple partitionable endpoints. A "partitionable endpoint" or "PE" is defined herein as any component or subcomponent of an I/O subsystem that can be allocated to an LPAR independently of any other component or subcomponent of the I/O subsystem. For example, some PEs may comprise a plurality of IOAs and/or I/O fabric components that function together and, thus, should be allocated as a unit to a single LPAR. Another PE, however, may comprise a portion of a single IOA, for example, a separately configurable and separately assignable port of a multi-port IOA. In general, a PE will be identified by its function rather than by its structure.

Figure 3:
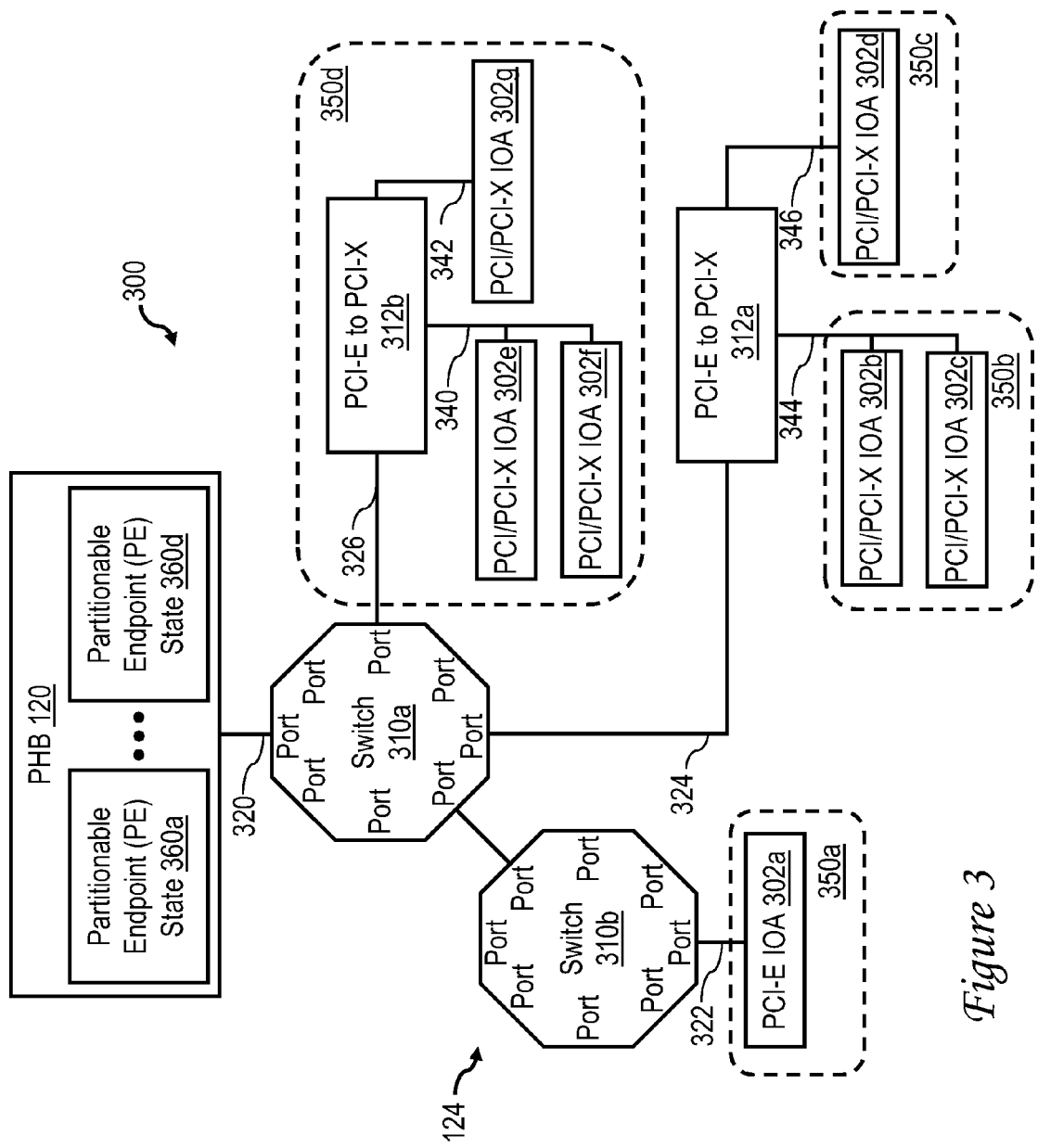
FIG. 3 illustrates an I/O subsystem that provides I/O resource isolation in a data processing system in accordance with one embodiment.

Referring now to FIG. 3, there is depicted a block diagram of at least a portion of the I/O subsystem 300 of a logically partitioned data processing system, such as data processing system 100 of FIG. 1, which exhibits resource isolation between LPARs 210 in accordance with one embodiment.

In the depicted embodiment, I/O subsystem 300 includes a PHB 120 coupled to a plurality of IOAs 302a-302g through an I/O fabric 124. I/O fabric 124 in turn includes switches 310a, 310b, PCI-Express (PCI-E) buses 320, 322, 324 and 326, PCI bridges 312a and 312b, and secondary buses 340, 342, 344 and 346.

As further shown in FIG. 3, system firmware 204 groups various components of I/O subsystem 300 to form a plurality of PEs 350a-350d that are each independently assignable to any of the LPARs 210 of the data processing system. In the given example, PE 350a and PE 350c each comprise a single IOA, namely, IOAs 302a and 302d, respectively. PE 350b, in contrast, comprises two IOAs 302b and 302c that must be assigned to the same LPAR 210. PE 350d comprises three IOAs 302e, 302f and 302g and PCI bridge 312b, which function together as a PE and therefore must be assigned to the same LPAR 210. As noted previously, in other embodiments, a PE may include only a portion (e.g., one or more ports) of an IOA.

In I/O subsystem 300, the respective state of each PE, referred to herein as the partitionable endpoint state, is maintained in the associated PHB 120. Thus, for example, PHB 120 of I/O subsystem 300 includes partitionable endpoint state registers 360a-360d, which correspond to and indicate the states of PEs 350a-350d, respectively.

System firmware 204 assigns each PE one or more domain numbers (or requester IDs (RIDs)) that associate its component(s) with that PE. In an exemplary embodiment, the domain number (i.e., RID) assigned each PE comprises a plurality of fields that can further be used to differentiate between I/O components in the PE. For example, these fields may include:

Bus number (Bus) field: provides the highest level of division between I/O resources, with each bus under a PHB having a unique bus number.

Device number (Dev) field: provides an intermediate level of division between I/O resources, with each IOA on a given bus having a different device number.

Function number (Func) field: provides the lowest level of division between I/O resources, with each distinct function of an IOA having a different function number.

As will be appreciated, the domain number (or RID) supports the division of I/O resources down to the lowest level of I/O functionality. For example, the domain number allows separate functions of a multiple function IOA to be differentiated. In data processing systems that do not require such a fine granularity, the domain number can be defined by the Bus field alone, allowing differentiation between the PEs connected to the same PHB, or by the Bus field together with either the Dev field or the Func field to permit differentiation between IOAs of a PE or differentiation between functions of an IOA in a PE that contains a multiple function IOA. The sparseness of the domain number space consisting of the Bus, Bus/Dev, or Bus/Dev/Func fields makes it desirable in many cases to condense the domain number space defined by these fields to something less sparse for internal usage by the PHB 120.

Among the isolation functionalities included in PHB 120 of FIG. 3 is the capability to isolate PE error domains. In logically partitioned data processing systems, different PEs may be assigned to different LPARs. Accordingly, PHBs 120 enable an error occurring in one PE to be isolated to the particular LPAR to which the PE is assigned. More particularly, each PHB 120 includes the capability of stopping I/O operations to and from a PE when an error is detected (referred to as the Stopped state). The stopping of I/O operations is preferably accomplished in such a way that:

1. The PE is prevented from completing an I/O operation in error,
    a. such that the PE does not propagate an error to any LPAR, and
    b. such that a requester of the I/O operation does not use erroneous data.
2. The stopping of operations should appear to a device driver to be isolated to just that device driver.
3. Software (at the device driver level or above) for one PE does not introduce an error that can cause another PE to enter the Stopped state.
4. Fault information for problem determination can be captured after the Stopped state occurs.
5. Firmware can access the configuration space below the PHB when any or all of the PEs are in the Stopped state.

In order to achieve error handling in accordance with these criteria, each PHB preferably provides isolation functionality that identifies a particular error domain for an I/O configuration operation. In a preferred embodiment, the configuration operation error domain capability is enabled by implementing a configuration PE number field in a register of the PHB, which field can be set by the system firmware. In addition, in a preferred embodiment, each PHB determines one or more PE numbers affected by an I/O message and routes the I/O message to only software specific to controlling those PE(s).

In addition to providing effective isolation functionality, it is also desirable to reduce the size of data structures within PHBs utilized in handling routine messages, such as DMA messages, interrupt messages (i.e., message signaled interrupts (MSIs)), and I/O error messages, particularly in embodiments in which PHBs are integrated into a common integrated circuit chip with the processor. Accordingly, as discussed further herein below, the footprint of data structures implemented within PHBs can be reduced by an improved determination of the PE(s) affected by I/O messages, such as DMA, interrupt messages and I/O error messages.

Figure 4:
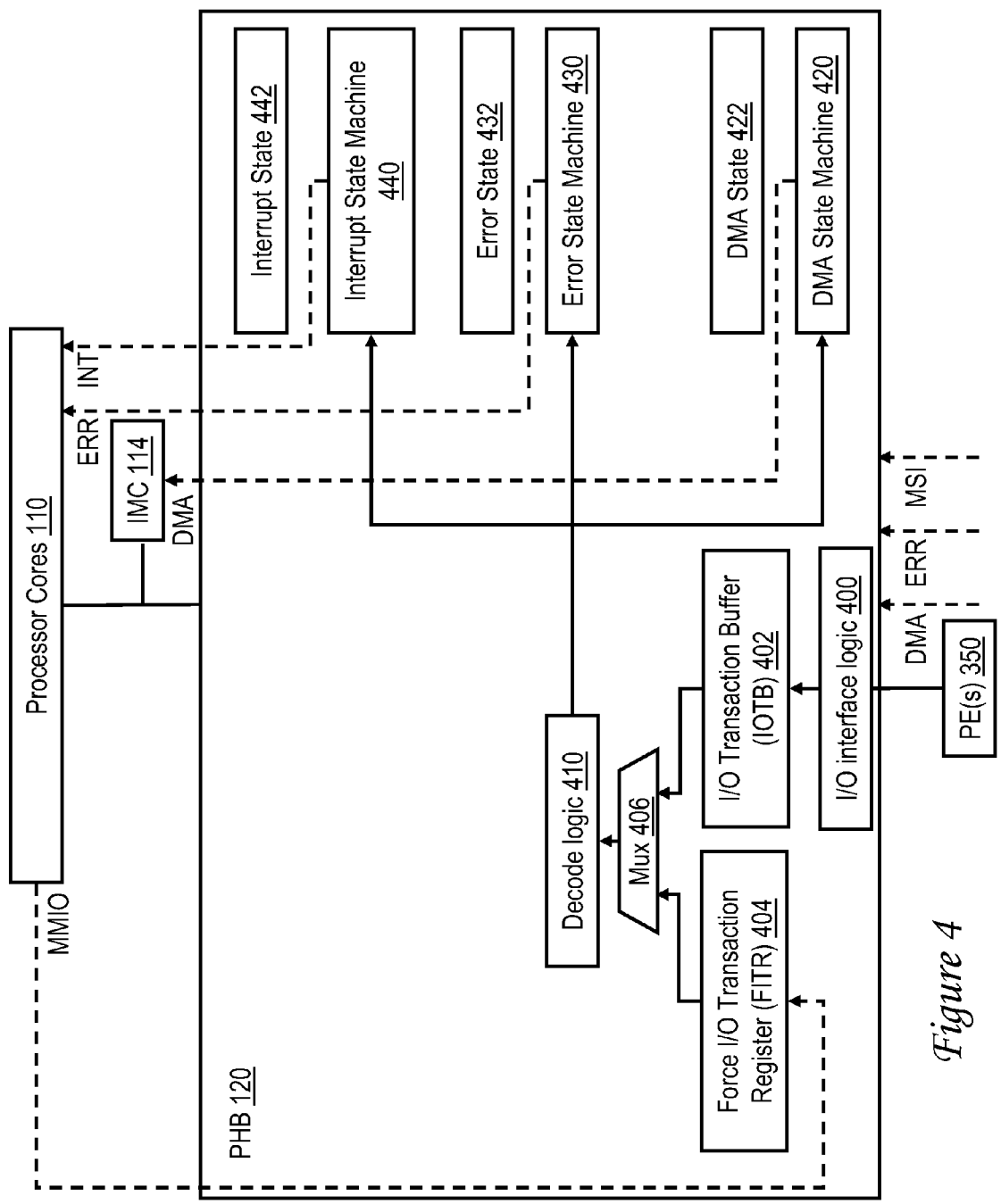
FIG. 4 illustrates a more detailed view of an I/O host bridge, such as a Peripheral Component Interconnect (PCI) host bridge (PHB), in accordance with one embodiment.

Referring now to FIG. 4, there is depicted a more detailed view of an exemplary I/O host bridge, such as a PHB 120, in accordance with one embodiment. PHB 120, which is coupled to processor cores 110 and one or more PEs 350 as further illustrated in FIGS. 1 and 3, includes I/O interface logic 400 that implements the I/O protocols of the I/O bus or link coupling PHB 120 to PE(s) 350. I/O interface logic 400 is coupled to an I/O transaction buffer (IOTB) 402 including one or more registers that buffer I/O messages received by PHB 120 from PE(s) 350. As indicated, the messages received by PHB 120 from PE(s) 350 can include, for example, direct memory access (DMA) messages, I/O error messages, and message signaled interrupts (MSIs).

PHB 120 further includes a memory-mapped Force I/O Transaction Register (FITR) 404 that is coupled to receive memory mapped I/O (MMIO) messages from software or firmware executing on processor cores 110. FITR 404, which preferably employs the same bit layout as IOTB 402, thus allows software or firmware to inject an I/O transaction into the stream of I/O transactions just as if the I/O transaction had been generated by one of PEs 350. For example, firmware or software may inject an interrupt into the I/O operation flow so that the PHB will queue up the interrupt and update the interrupt state in the same manner as if an I/O device presented that same interrupt. Alternatively, the software or firmware may want to have PHB 120 re-queue an interrupt that the software or firmware cannot process at the current time. Similarly, the software or firmware may want to use PHB 120 to manage writing or reading data to or from system memory 116, such that the memory access operation uses the hardware of PHB 120 in the same way as if a DMA transaction was received from an I/O device. Injection of a DMA transaction in the manner could be useful, for example, in testing the DMA handling capabilities of PHB 120.

FITR 404 and IOTB 402 are each coupled to an input of a two-input multiplexer (mux) 406, which selects among the I/O transactions presented by FITR 404 and IOTB 402 for processing, for example, utilizing a round robin or other prioritization methodology as in known in the art. Multiplexer 406 passes an I/O transaction selected for processing to decode logic 410, which decodes the I/O transaction and presents the I/O transaction to the appropriate state machine of PHB 120 for handling.

In the depicted embodiment, PHB 120 includes a DMA state machine 420 having an associated DMA state 422, an error state machine 430 having an associated error state 432, and an interrupt state machine 440 having an associated interrupt state 442. In response to decoding an I/O transaction, decode logic 410 invokes the appropriate one of state machines 420, 430 and 440, which in turn performs the appropriate operation and updates its associated state 422, 432, or 442, as appropriate. As shown, in servicing I/O transactions, DMA state machine 420 transmits DMA commands to the relevant IMCs 114, while error state machine 430 and interrupt state machine 440 communicate errors and interrupts, respectively, to software and/or firmware 204 or 214 executing on processor cores 110.

Figure 5:
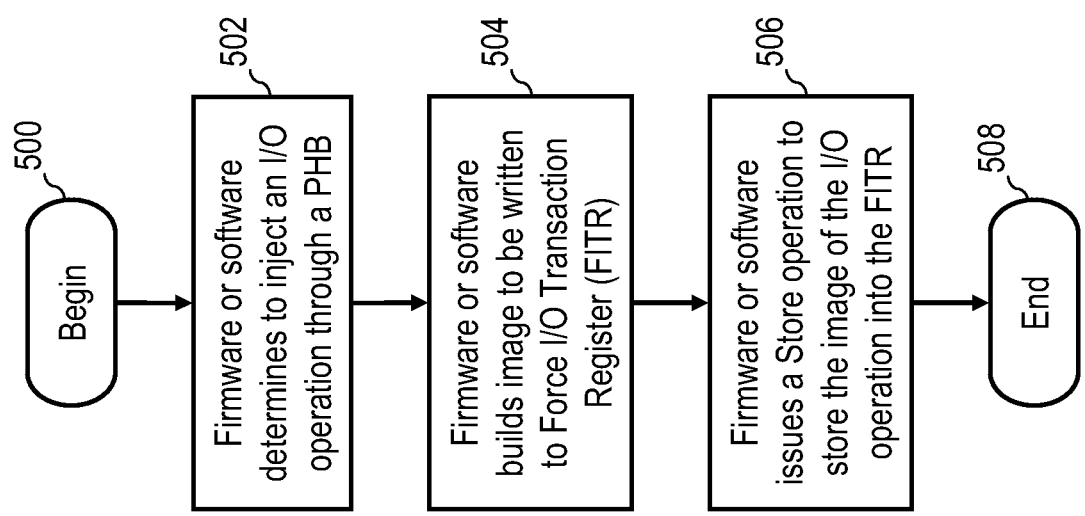
FIG. 5 is a high level logical flowchart of an exemplary process by which firmware or software injects an I/O operation in an I/O host bridge in accordance with one embodiment.

With reference now to FIG. 5, there is illustrated a high level logical flowchart of an exemplary process by which firmware 204 or 214 or software injects an I/O transaction into the I/O transaction flow of an I/O host bridge, such as a PHB 120, in accordance with one embodiment. As a logical rather than strictly chronological flowchart, it should be understood that at least some of the illustrated steps may be performed concurrently or in an order different than that illustrated.

The illustrated process begins at block 500 and then proceeds to block 502, which depicts firmware or software determining to inject an I/O transaction into the I/O transaction flow of a PHB 120. The firmware or software builds the image of the I/O transaction to be written into FITR 404 at block 504, and at block 506, issues one or more MMIO Store operations to store the image of the I/O transaction into FITR 404. The process thereafter terminates at block 508.

Figure 6:
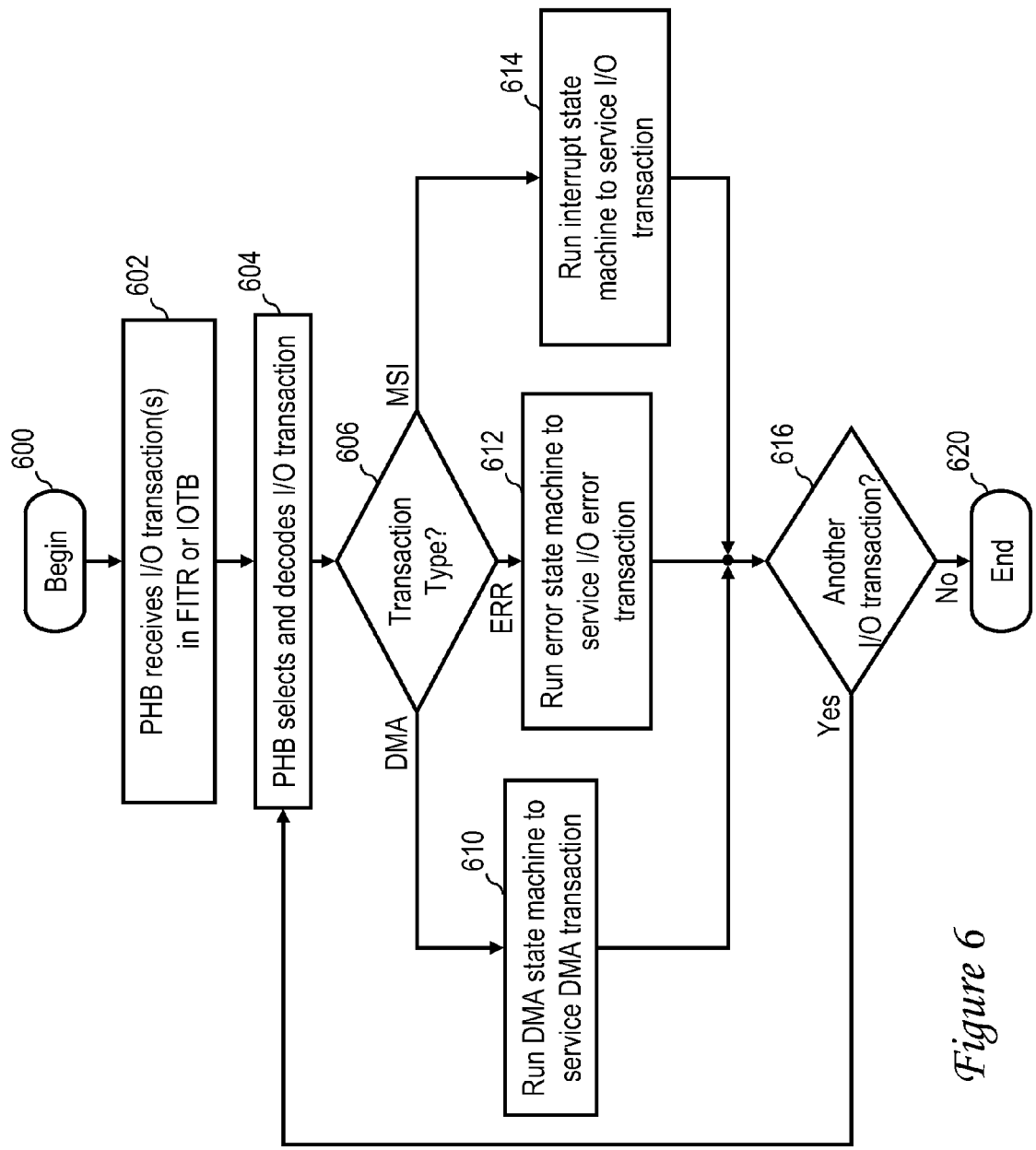
FIG. 6 is a high level logical flowchart of an exemplary process by which an I/O host bridge services an I/O operation received from an I/O subsystem or firmware or software in accordance with one embodiment.

Referring now to FIG. 6, there is depicted a high level logical flowchart of an exemplary process by which an I/O host bridge, such as a PHB 120, services an I/O transaction received from an I/O subsystem or firmware or software in accordance with one embodiment. The process begins at block 600 and the proceeds to block 602, which depicts a PHB 120 receiving one or more I/O transactions in FITR 404 and/or IOTB 402. At block 604, multiplexer 406 selects and decode logic 410 decodes the I/O transaction. As indicated by blocks 606-614, decode logic 410 then routes the I/O transaction for servicing by the appropriate state machine instance: DMA transactions to DMA state machine 420 (as discussed further below with reference to FIGS. 7A-7B, 8A-8B and 9), I/O error transactions to error state machine 430 (as discussed further below with reference to FIGS. 10A-10B, 11A-11B and 12), and MSI transactions to interrupt state machine 440 (as discussed further below with reference to FIGS. 13A-13B, 14, 15A-15B, 16A-16B and 17).

PHB 120 additionally determines at block 616 whether or not there are any more I/O transactions to be processed, either in FITR 404 or the IOTB 402. If so, the process returns to block 604, which has been described. If not, the process depicted in FIG. 6 terminates at block 620.

Referring now to FIG. 7A, there is depicted a conventional PHB 700 as described in U.S. Pat. No. 7,398,727, which is implemented in an integrated circuit chip separate from the processor. To facilitate processing of DMA transactions, PHB 700 includes a wide data structure referred to as Translation and Validation Table (TVT) 702. TVT 702 includes a plurality of Translation and Validation Entries (TVEs) 704. As shown in FIG. 7B, each conventional TVE 704 comprises a number of fields including Requester ID (RID) and RID Validate Control field 730 specifying a RID and control information for validating the RID, a PE# field 732 indicating a PE associated with the RID, a Translation Control Entry (TCE) table size field 737, an I/O page size field 736, and a TCE table start address field 738 indicating the base address of the TCE table for the specified PE.

PHB 700 validates RIDs of Direct Memory Access (DMA) requests and translates RIDs to particular PEs by reference to TVT 702. As shown, PHB 700 receives a Direct Memory Access (DMA) packet including a RID 710 (which comprises a bus number, a device number and a function number) and a DMA address 712. Several bits of DMA address 712 form a TVE index (TVEI) 717 into TVT 702 that selects a particular TVE 704 for access. Once the TVE 704 is selected, the content of PE# field 732 is read out to determine the current state of the PE. In addition, the content of RID and RID Validate Control field 730 is compared with incoming RID 710 as shown at block 720. If RID 710 does not match the RID specified in field 730, PHB 700 does not permit the requested DMA operation to be performed. As indicated at block 722, PHB 700 also truncates the low order n bits of DMA address 712 (where $2^n$ is the I/O page size specified by I/O page size field 736 of the selected TVE 704) and compares the remaining DMA address bits below TVEI 717 with TCE table size field 737 of the selected TVE 704. If DMA address 712 specifies an address past the end of the relevant TCE table, PHB 700 disallows the DMA operation. If, on the other hand, the validations shown at block 720 and 722 are successful, PHB 700 performs the requested DMA operation utilizing the DMA address-to-real address translation contained in the in-memory TCE table for the PE, which is pointed to by the contents of TCE start address field 738.

It should be noted that the conventional TVE 704 depicted in FIGS. 7A-7B contains numerous multi-bit fields, and consequently conventional TVT 702 is a large data structure that requires considerable die area. In addition, each PE does not have use of TVEI field 717 of DMA address 712 for its own application, meaning that the DMA address space is carved into different discontiguous spaces for the various PEs.

With reference now to FIG. 8A, there is illustrated a more detailed view of improved handling of DMA transactions by an I/O host bridge, such as a PHB 120, in accordance with one embodiment. In general, it is desirable to reduce the die area of PHB 120, particularly in preferred embodiments in which PHB 120 is integrated within the integrated circuit chip of processor 102 as shown in FIG. 1. One factor contributing to the reduction in the die area of PHB 120 is a reduction in the size of data structures within PHB 120 utilized to validate and translate DMA, I/O error and MSI messages. Specifically, as detailed further below, the 16-bit RID field and PE# field formerly found in each conventional TVE 404 can be removed, leading to a significant reduction in the width of TVEs and a concomitant reduction in the overall footprint of the TVT and PHB 120.

In the arrangement shown in FIG. 8A, a RID Translation Table (RTT) 800, which may be populated and maintained, for example, by system firmware 204 based upon its allocation of I/O resources among LPARs 210, includes a plurality of RID Translation Entries (RTEs) 802. Each RTE 802 associates a respective RID, such as conventional 16-bit PCI RID 410, with a PE. RTT 800 can be implemented either in PHB 120, or more preferably, in an off-chip storage location, such as system memory 116. In embodiments in which RTT 800 is implemented off-chip, PHB 120 can optionally include a small on-chip RID Translation Cache (RTC) 804 (e.g., in decode logic 410) to provide lower latency access to copies of the most recently accessed RTEs 802.

FIG. 8A further illustrates that PHB 120 includes a streamlined TVT 810 including a plurality of TVEs 812. As depicted in FIG. 8B, each TVE 812 comprises a small number of bit fields including a Translation Control Entry (TCE) table size field 834 indicating a table size of the TCE table 860 for the PE originating the DMA, an I/O page size field 836, and a TCE table start address field 838 indicating the base address of the in-memory TCE table 860 for the source PE. It should be noted upon comparison to FIG. 7B that TVEs 812 lack fields corresponding to conventional fields 430 and 432, resulting in a significant size reduction in TVT 810.

The operation of PHB 120 in servicing a DMA request will now be described with reference to FIGS. 8A-8B and with additional reference to the high level logical flowchart provided in FIG. 9. The process begins at block 900 and then proceeds to block 902, which illustrates PHB 120 receiving a Direct Memory Access (DMA) operation including a conventional RID 710 and a DMA address 840. PHB 120 utilizes the RID 710 of the DMA operation to access a particular RTE 802, either from RTC 804 (if present) or from RTT 800 (block 904). The accessed RTE 802 specifies a PE, which PHB 120 utilizes to access the current state of the PE. PHB 120 also utilizes the PE# specified by the accessed RTE 802 to access TVT 810 (block 906). In some embodiments in which each PE has a single associated TVE 812, the PE# directly indexes into TVT 810. In alternative embodiments in which each PE may have one or more TVEs 812 (e.g., to enable multiple I/O page sizes for at least some PEs), then PHB 120 can additionally utilize one or more PE index (PEI) bits 814 from DMA address 840 to select between the multiple TVEs 812 associated with the selected PE. It should be appreciated that the use of PEI 814 does not carve up the DMA address space between different PEs, as does TVEI 714 of FIG. 7A, but only divides the DMA address space within the selected PE's address space, thus advantageously making the entire DMA address space available to each PE.

Following block 906, the process of FIG. 9 proceeds to block 908, which depicts DMA address validation logic 850 (e.g., in DMA state machine 420) truncating the low order n bits of DMA address 840 (where $2^n$ is the I/O page size specified by I/O page size field 836 of the selected TVE 812) and comparing the remaining upper order DMA address bits with the contents of TCE table size field 834 of the selected TVE 812. As indicated at block 910, if DMA address 840 specifies an address past the end of the relevant TCE table 860, the validation fails, and PHB disallows the DMA operation as indicated by the process terminating at block 920. If, on the other hand, DMA address 840 passes validation, as indicated by a positive determination at block 910, PHB 120 (i.e., DMA state machine 420) translates DMA address 840 to a real address in system memory 116 (block 912). In one embodiment, PHB 120 performs the address translation by reference to the in-memory TCE table 860 utilizing the particular TCE therein pointed to by an address formed by combining the contents of TCE table start address field 838 of the selected TVE 812 and the mid-order bits of DMA address 840 between PEI 814 and the n low-order address bits. PHB 120 then transmits the DMA operation to the IMC 114 of the target system memory 116 using the system memory (e.g., real) address obtained by the address translation in order to invoke performance of the requested DMA operation (block 914). If the DMA operation is a DMA Read, DMA state machine 420 additionally returns the requested data to the DMA requester (e.g., software, firmware or PE 350) as shown at block 916. Thereafter, the process shown in FIG. 9 terminates at block 920.

A similar technique for providing isolation between PEs while minimizing the size of data structures in PHBs 120 is also applicable to the isolation of I/O error messages, as discussed further below with reference to FIGS. 10A-10B, 11A-11B and 12.

With reference first to FIG. 10A, there is illustrated a second view of conventional PHB 700 of FIG. 7A that depicts the data structure utilized in handling I/O (e.g., PCIe) error messages in the prior art. As shown, in addition to the data structures previously discussed, PHB 700 includes a wide data structure referred to as PE Lookup Table (PELT) 1000. PELT 1000, which is implemented in expensive content-addressable memory (CAM), includes a plurality of PE Lookup Entries (PELEs) 1002. As shown in FIG. 10B, each conventional PELE 1002 comprises Requester ID (RID) and RID Validate Control field 1010 specifying a RID and control information for validating the RID, as well as a PE Lookup Vector (PELV) field 1012 indicating by set bits (e.g., 1's) which PE number(s) are affected by the I/O error.

In the prior art, PHB 700 receives a PCIe error message 1004 together with a RID 710 identifying which I/O component is the source of PCIe error message 1004. In response, PHB 700 utilizes RID 710 to perform a CAM access to PELT 1000 to identify a matching PELE 1002 containing a matching RID in its RID and RID Validate Control field 1010. PHB 700 then processes the PCIe error message for each PE specified by the PELV field 1012 of the matching PELE 1002.

Figures 11A, 11B:
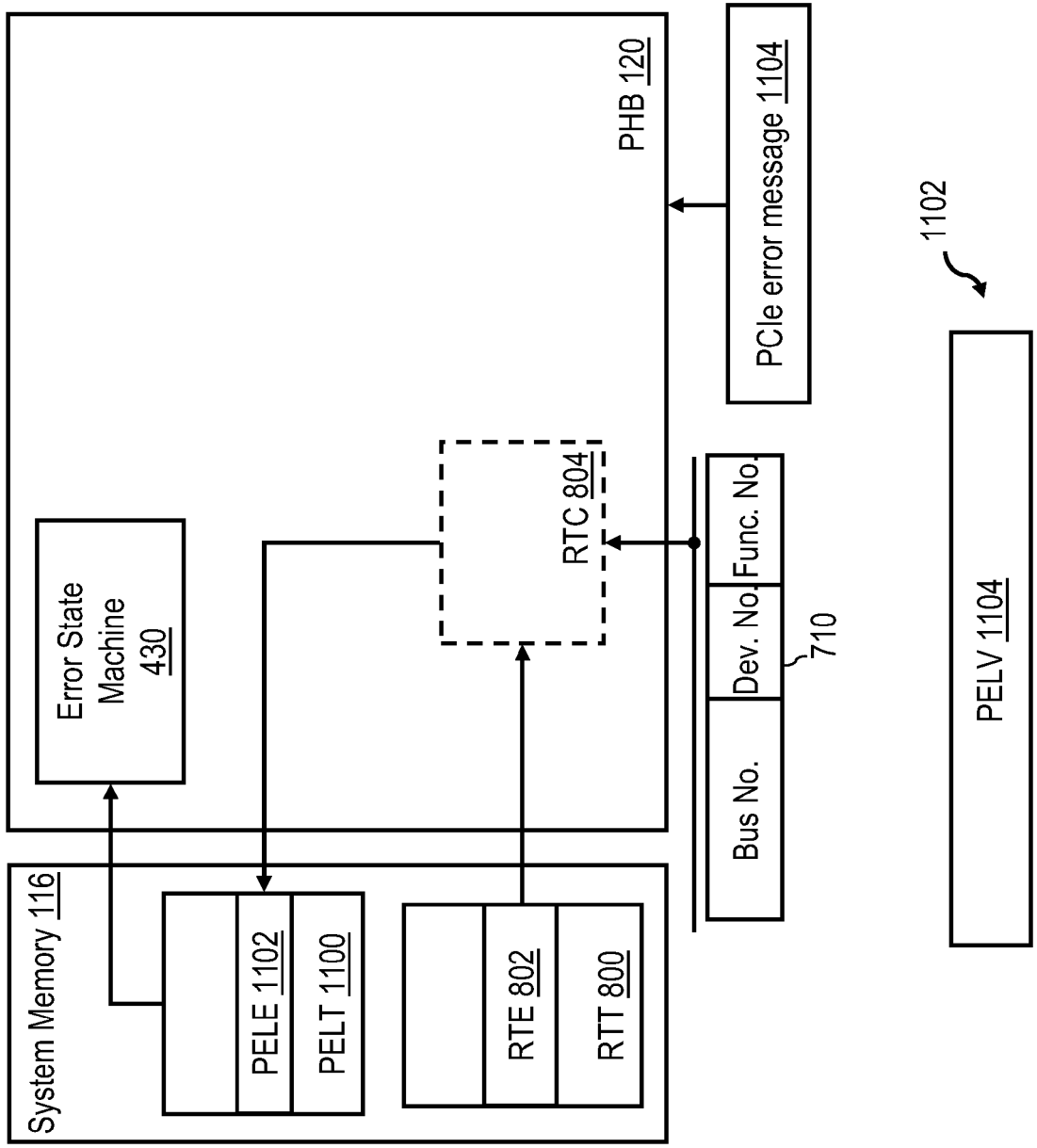
FIG. 11A depicts an improved Peripheral Component Interconnect (PCI) host bridge (PHB) in one exemplary embodiment.
FIG. 11B illustrates an improved PE Lookup Entry (PELE) utilized by the improved PHB of FIG. 11A.

Referring now to FIG. 11A, there is depicted a more detailed view of improved handling of I/O error transactions by a PHB 120 in accordance with one embodiment. As noted above, it is desirable to reduce the die area of PHB 120, particularly in preferred embodiments in which PHB 120 is integrated within processor 102 as shown in FIG. 1. One factor contributing to the reduction in the die area of PHB 120 is the elimination of the RID field found in each conventional PELE 1002, leading to a significant reduction in the width of PELEs and a concomitant reduction in the overall footprint of PHB 120. It is further desirable to reduce or eliminate utilization of expensive CAM, such as that utilized to implement conventional PELT 1000.

Consequently, in the arrangement shown in FIG. 11A, RTT 800, which is preferably implemented in system memory 116, is again utilized to associate each possible RID that may be received by PHB 120, such as conventional 16-bit PCI RID 710, with a PE. As noted above, to reduce access latency in embodiments in which RTT 800 is implemented off-chip, PHB 120 can optionally include a small on-chip RTC 804 (e.g., in decode logic 410) to provide lower latency access to copies of the most recently accessed RTEs 502.

FIG. 11A further illustrates that system memory 116, which is preferably implemented with a low cost non-CAM technology (e.g., DRAM), preferably implements a streamlined PELT 1110 including a plurality of PELEs 1102. As depicted in FIG. 11B, each PELE 1102 comprises a PELV 1104 containing a plurality of bits each corresponding to a respective one of a plurality of PE numbers. As described above, PELV 1104 identifies with one or more set bits (e.g., 1's) the PE(s) against which an error occurring a given RID should be processed. Multiple PEs can be implicated in an error, for example, if the error related to an I/O component coupled to multiple PEs (e.g., a switch 310) or to multiple functions associated with a single device (e.g., multiple ports of an IOA 130). It should be noted that PELEs 1102 lack a field corresponding to conventional field 1010, resulting in a significant size reduction in PELT 1100.

Figure 12:
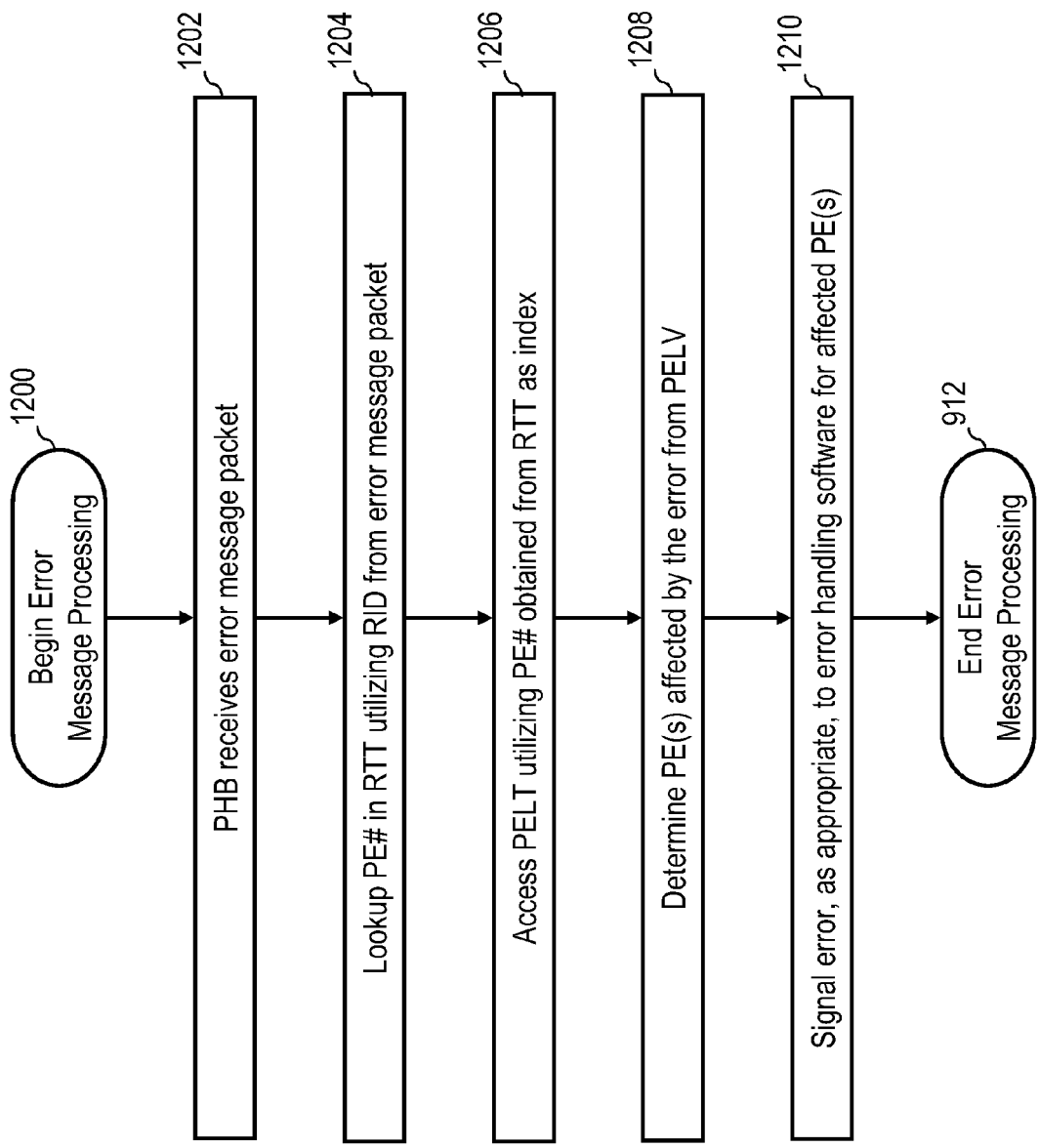
FIG. 12 is a high level logical flowchart of an exemplary process by which I/O host bridge, such as a PHB, handles an I/O error message in accordance with one embodiment.

The operation of PHB 120 in handling an I/O error message will now be described with additional reference to the high level logical flowchart provided in FIG. 12. The I/O error message handling process begins at block 1200 and then proceeds to block 1202, which illustrates a PHB 120 receiving an I/O error message packet containing an error message 704 and a RID 410 identifying the source of the I/O error message. PHB 120 (e.g., decode logic 410) utilizes the RID 410 of the I/O error packet to access a particular RTE 502, either from RTC 504 (if present) or from RTT 500 (block 1204). The accessed RTE 502 specifies a PE#, which PHB 120 (e.g., error state machine 430) utilizes as a direct index to access PELT 1100 (block 1206). It should be noted that since a direct index into PELT 1100 is available, it is not necessary to implement PELT 1100 in expensive CAM.

Next, at block 1208, PHB 120 (e.g., error state machine 430) determines which PEs are affected by the I/O error by examining which bit or bits are set in the PELV field 1104 of the selected PELE 1102 in PELT 1100. In response to the determination of the affected PE(s), error state machine 430 in PHB 120 signals the I/O error as appropriate to only the error handling software or firmware (e.g., device driver software of one or more OSs 212) responsible for handling errors for the affected PE(s) (block 1210). The error handing process then completes at block 1212.

Figures 13A, 13B:
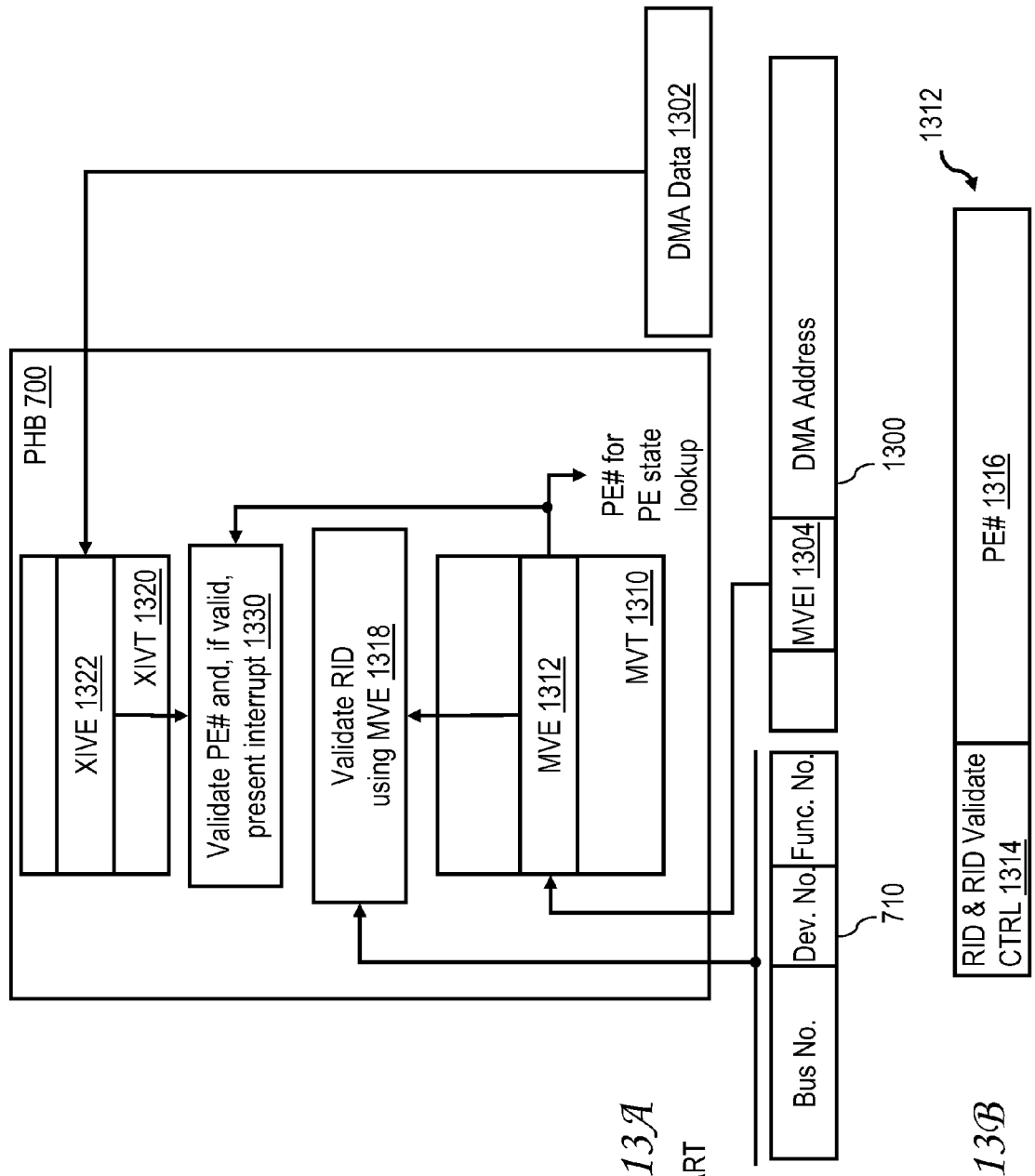
FIG. 13A depicts handling of an interrupt by a conventional Peripheral Component Interconnect (PCI) host bridge (PHB)
FIG. 13B illustrates a conventional Message Signaled Interrupt (MSI) Validation Entry (MVE)

With reference now to FIG. 13A, there is illustrated a third view of conventional PHB 700 of FIG. 7A that depicts the data structure utilized in handling message signal interrupts (MSIs) in the prior art. A MSI includes a RID 710 and a MSI vector, which includes a DMA address 1300 specifying an address in a system-specific address range allocated to interrupts (e.g., bits 61:60 of an 8-byte DMA address set to 0b01) as well as DMA data 1302. Several mid-order bits of DMA address 1300 form a MSI Validation Entry (MVE) index (MVEI) 1304 into a MSI Validation Table (MVT) 1310 in PHB 700.

Each MVE 1312 in MVT 1310 contains a number of fields, which as indicated in FIG. 13B, includes RID and RID control field 1314 and PE number field 1316. After accessing an MVE 1312 utilizing MVEI 1304, PHB 700 validates the specified RID 710 by reference to RID and RID control field 1314, as depicted at block 1318. If the two RIDs do not match, PHB 700 does not allow the MSI.

PHB 700 additionally utilizes the low order bits of DMA data 1302 as an eXternal Interrupt Vector Entry (XIVE) index to select an XIVE 1322 in an eXternal Interrupt Vector Table (XIVT) 1320 in PHB 700. The selected XIVE 1320 contains interrupt information and state, as well as the PE number that is allowed to access the interrupt represented by the XIVE 1322. As indicated at block 1330, PHB 700 validates the PE number obtained from the selected XIVE 1322 and the selected MVE 1322, and if the two PE numbers do not match, the MSI is ignored. However, if PHB 700 successfully validates the PE#, PHB 700 presents the interrupt information to the system based on the state information in the selected XIVE 1322.

The conventional structures and MSI handling techniques employed by PHB 700 have the disadvantage of implementing a 16-bit RID and associated RID control bits in each MVE 1312, thus requiring considerable die area for MVT 1310. In addition, PHB 700 is required to internally track the entire state of each interrupt, including clearing of that state when the interrupt is signaled by the system as complete.

Figures 14A, 14B:
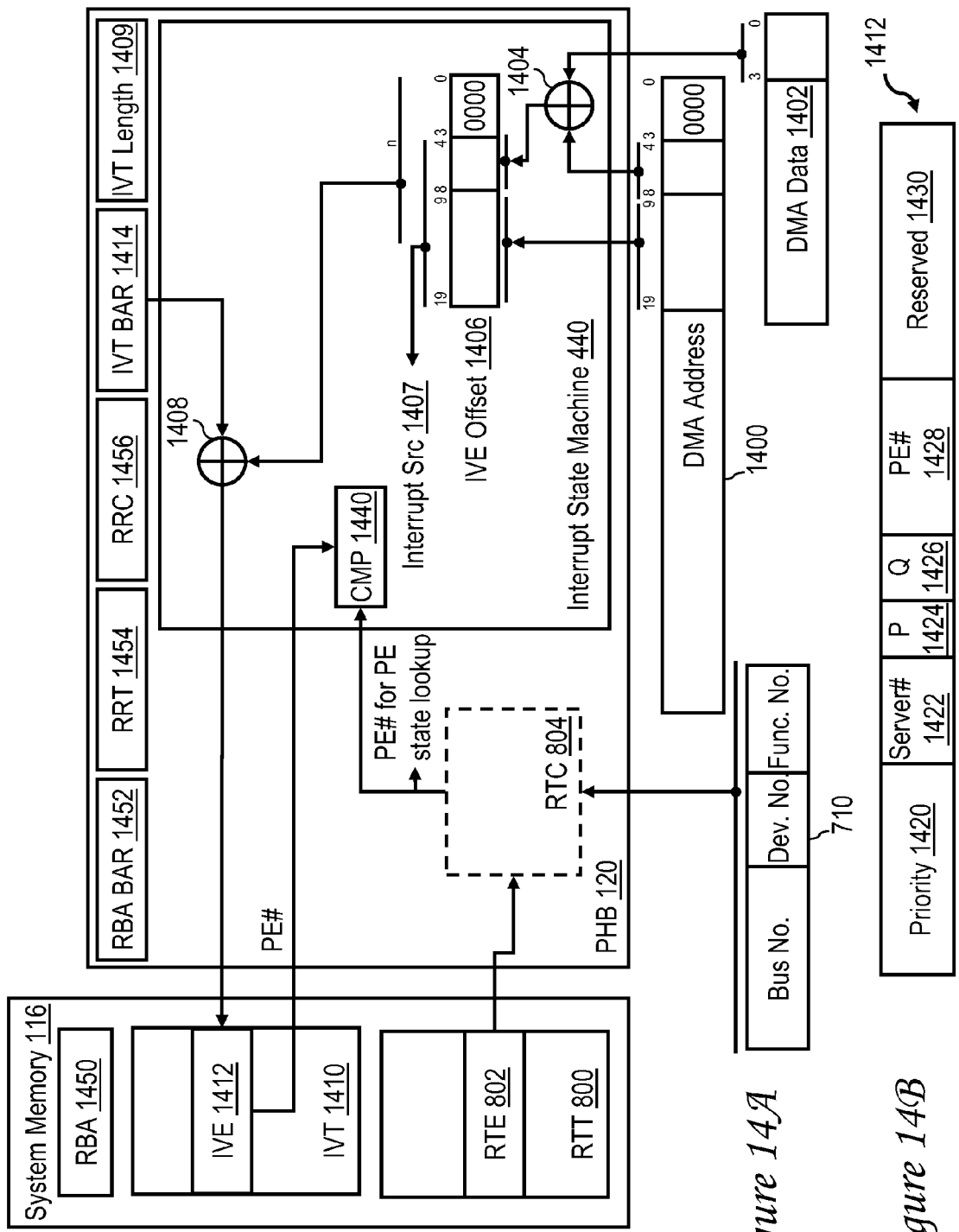
FIG. 14A depicts an improved Peripheral Component Interconnect (PCI) host bridge (PHB) in one exemplary embodiment.
FIG. 14B illustrates an Interrupt Vector Entry (IVE) in accordance with one exemplary embodiment.

Referring now to FIG. 14A, there is depicted a view of an I/O host bridge, such as PHB 120, detailing the handling of MSIs by an interrupt state machine 440. As discussed above, PHB 120 receives MSIs via FITR 402 or IOTB 404 that each include a conventional RID 710, as well as a MSI vector comprising DMA data 1402 and a DMA address 1400 specifying an address in a system-specific address range allocated to interrupts.

As with the DMA and I/O error messages described above, PHB 120 employs RID 710 as a direct index to select an RTE 802 of RTT 800, either from RTT 800 itself or from RTC 804 (if implemented). The selected RTE 802 has a single field containing the PE# associated with RID 710 of the incoming MSI. It should be noted by comparison to the prior art MVE 1312 shown in FIG. 13B that RTE 802 omits RID and RID validate control field 1314, resulting in a significantly smaller entry. Further, because a single data structure (i.e., RTT 800) is utilized to determine the PE# for DMA, I/O error and MSI messages, significant efficiency is achieved.

Interrupt state machine 440 includes combinational logic that performs a logical OR (as shown at reference numeral 1404) or adds portions of the DMA address 1400 and DMA data 1402 to obtain a MSI scalar. For example, in the illustrated embodiment, logical OR 1404 combines the 4 lowest order bits (i.e., bits 3:0) of DMA data 1402 with bits 8:4 of DMA address 1400 to obtain a five-bit MSI scalar. As further shown in FIG. 14A, interrupt state machine 440 forms an interrupt vector entry (IVE) offset 1406 including high order bits (e.g., bits 19:9) from DMA address 1400, mid-order bits from the MSI scalar, and zeroed low-order bits (e.g., bits 3:0) aligning IVE offset 1406 on the IVE size. Interrupt state machine 440 includes a logical OR 1408 that combines IVE offset 1406 with the base system memory (physical) address of an interrupt vector table (IVT) 1410 specified by an IVT base address register (BAR) 1414 to form an index that selects an IVE 1412 from among the plurality of IVEs in IVT 1410 in system memory 116. If IVE offset 1406 determined by logical OR 1404 exceeds the predetermined value in the IVT length register 1409, then the interrupt vector is invalid, and the MSI is ignored.

The selected IVE 1412 contains interrupt information and state for the MSI, as well as the PE# allowed to access the MSI represented by the selected IVE 1412. Specifically, as shown in FIG. 14B, an exemplary embodiment of an IVE 1412 includes a priority field 1420, which specifies a priority of the interrupt packet to be communicated to the interrupt presentation layer of data processing system 100 (which may, for example, be implemented in an OS 212 and/or system firmware 204). IVE 1412 further includes a server number field 1422 that identifies a server number to be communicated to the interrupt presentation layer in the interrupt packet. The interrupt packet additionally includes the interrupt source number 1407, comprising, for example, bits 19:9 of IVE offset 1406 depicted in FIG. 14A.

Still referring to FIG. 14B, IVE 1412 additionally includes is a Presented (P) field 1424, which indicates whether or not the interrupt has already been presented to the system so that duplicate incoming MSIs are not presented, but are dropped. In addition, a Queued (Q) field 1426 of IVE 1412 indicates if one or more additional interrupts are received for the same IVE 1412 so that interrupts are not lost during interrupt processing of a previously presented interrupt. Finally, IVE 1412 includes a PE number field 1428 indicating a PE 350 authorized to issue the MSI and a reserved field 1430 enabling expansion of interrupt handling functionality and alignment of IVEs 1412 on binary boundaries to make computation of IVE offset 1406 more efficient.

Because a MSI is simply a DMA packet with a particular address, an interrupt source may produce an interrupt vector that is not valid (e.g., that accesses another PE's interrupt). Accordingly, interrupt state machine 440 provides interrupt isolation between PEs by validating that the interrupt source is authorized to access the IVE 1412 and to issue the associated interrupt. To perform this validation, interrupt state machine 440 additionally includes a comparator 1440 that receives and compares the PE# specified by the selected RTE 802 and the PE# specified by PE number field 1428 of the selected IVE 1412. If comparator 1440 detects a match, interrupt state machine 440 presents the interrupt packet to the interrupt presentation layer of data processing system 100 based upon the state information contained in the selected IVE 1412, as discussed further below. If comparator 1440 does not detect a match, interrupt state machine 440 ignores the MSI.

It should be appreciated that the interrupt presentation layer may not be able to accept an interrupt packet presented to it and may consequently reject the interrupt. Accordingly, the interrupt source layer, comprising system memory 116, PHB 120 and interrupt state machine 440, supports queuing and re-presentation of rejected interrupts. In particular, system memory 116 includes a reject bit array (RBA) 1450 identifying rejected interrupts. PHB 120 identifies the physical address of RBA 1450 in system memory 116 in a RBA BAR 1452. PHB 120 additionally includes a reject represent timer (RRT) 1454 and reject represent counter (RRC) 1456 used to control the re-presentation of rejected interrupts as discussed further below with reference to FIG. 17.

Figure 15A:
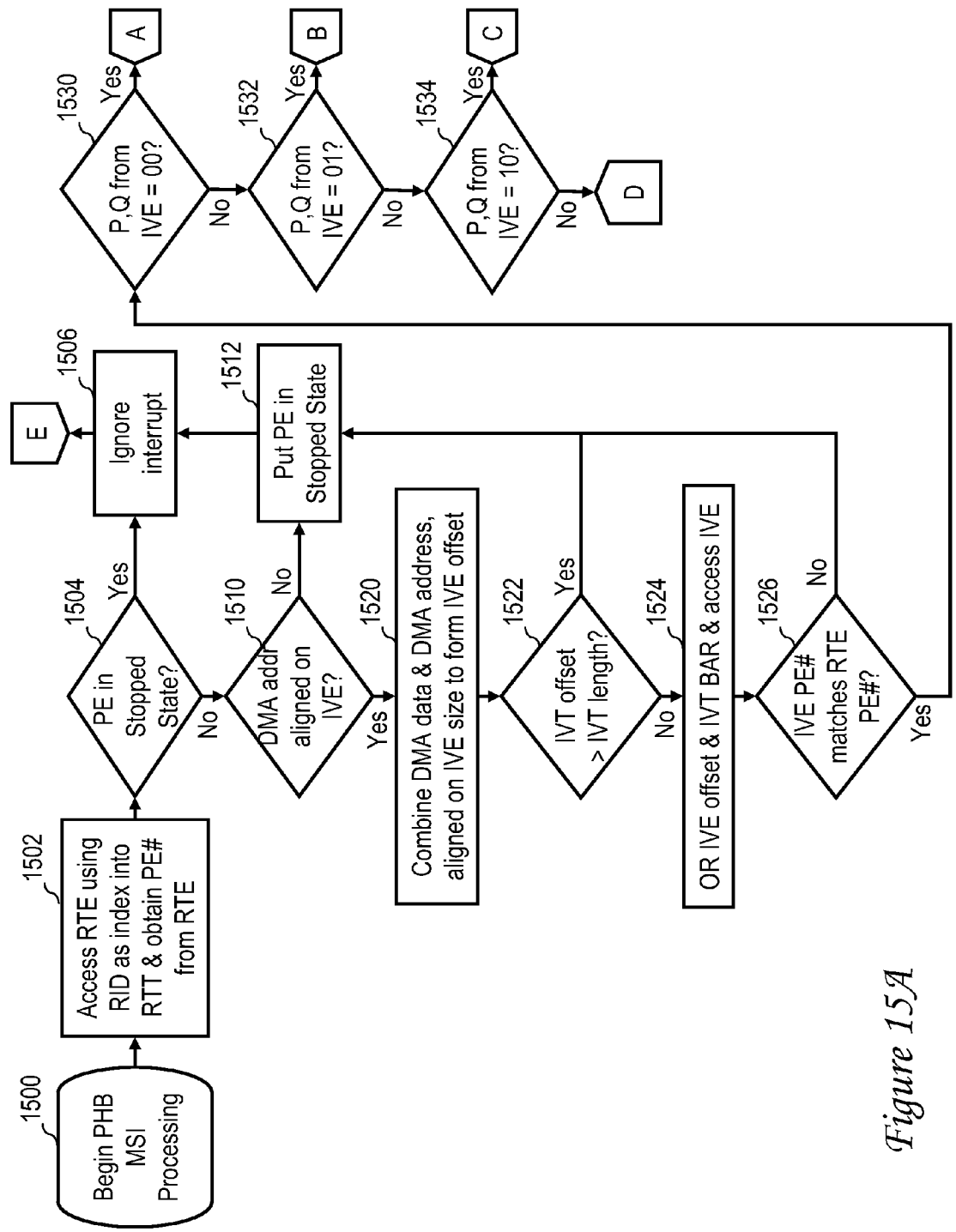
FIGS. 15A-15B together form a high level logical flowchart of an exemplary process by which an I/O host bridge, such as a PHB, processes a message signaled interrupt (MSI) in accordance with one embodiment.
Figure 15B:
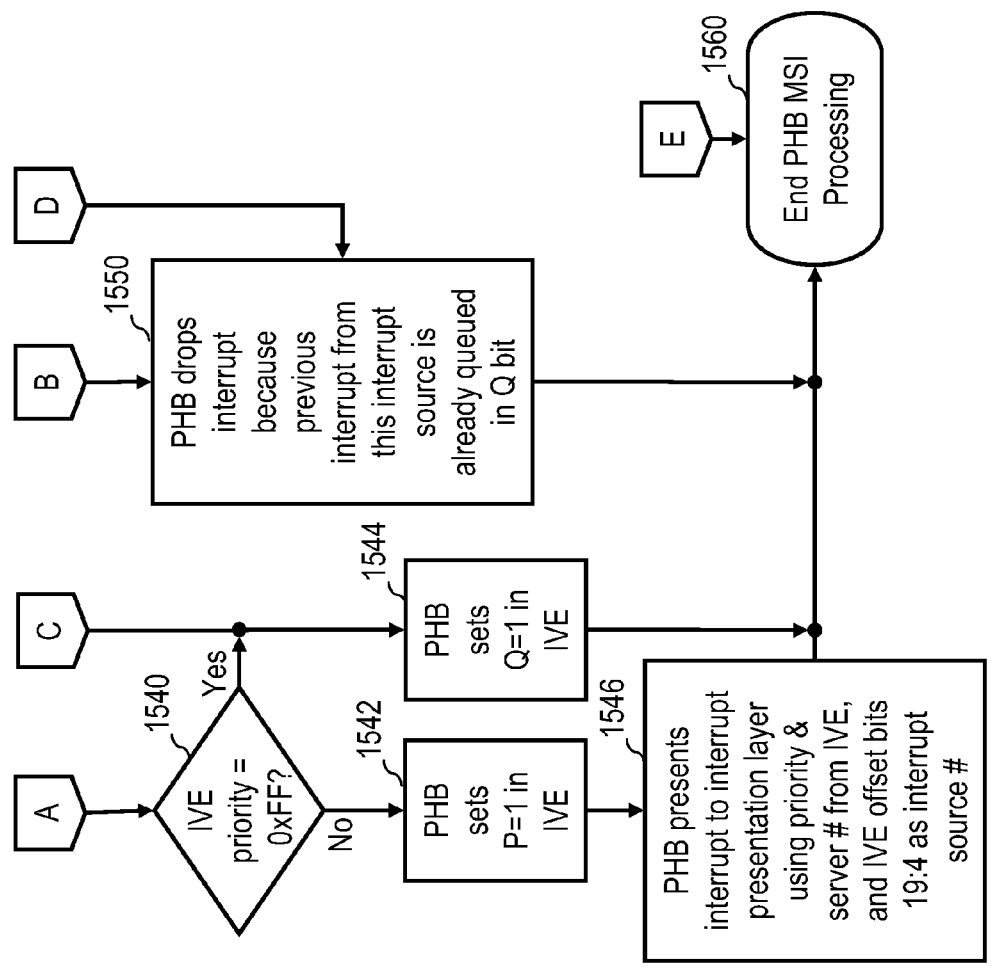

With reference now to FIGS. 15A-15B, there is illustrated a high level logical flowchart of an exemplary process by which an I/O host bridge, such as a PHB 120, handles an MSI in accordance with one embodiment. The process begins at block 1500 in response to selection of an MSI for processing from FITR 404 or IOTB 402 by multiplexer 406. As illustrated at block 1502, PHB 120 accesses an RTE 802 of RTT 800 (either in system memory 116 or in RTC 804) utilizing the RID 710 specified by the MSI as an index (block 1502). This access to RTE 802, which is preferably performed during the decoding of the MSI by decode logic 410, indicates which PE number is permitted to issue the received MSI.

PHB 120 additionally determines at block 1504 whether or not the PE identified by the PE number obtained from the selected RTE 802 is in the Stopped State by reference to the PE state register 360 of the PE. If PHB 120 determines that the relevant PE is in the Stopped State, PHB 120 ignores the MSI, as indicated at block 1506. Thereafter, the process passes through page connector E, and processing of the MSI terminates at block 1560. If, however, PHB 120 determines at block 1504 that the relevant PE is not in the Stopped State, then decode logic 410 invokes handling of the MSI by interrupt state machine 440 at block 1510.

Block 1510 depicts interrupt state machine 440 determining whether or not the DMA address 1400 specified by the MSI is aligned on an IVE boundary, that is, if the appropriate number of low-order address bits are zeroes. If interrupt state machine 440 determines that the DMA address 1400 is not properly aligned, interrupt state machine 440 places the relevant PE into the Stopped State by setting the appropriate PE state register 360, as shown at block 1512. The process then proceeds to block 1506 and following blocks, which have been described.

Returning to block 1510, if interrupt state machine 440 determines that the DMA address 1400 of the MSI is properly aligned, then interrupt state machine 440 logically combines (e.g., adds or performs a logical OR) the mid-order bits of DMA address 1400 (e.g., bits 19:4) and the low-order bits of DMA data 1402 (e.g., bits 3:0) to form IVE offset 1406 (block 1520). Interrupt state machine 440 then determines at block 1522 whether or not IVT offset 1406 is greater than the length of IVT 1410 specified by IVT length register 1409. If so, then an error is detected, and the process proceeds to block 1512 and following blocks, which have been described.

If interrupt state machine 440 determines at block 1522 that IVE offset 1406 does not exceed the length of IVT 1410 specified by IVT length register 1409, then processing proceeds to block 1524. Block 1524 depicts logical OR 1408 of interrupt state machine 440 logically combining IVE offset 1406 with the base system memory address specified by IVT BAR 1414 to obtain the real address of an IVE 1412, which is then read from system memory 116 by interrupt state machine 440.

Comparator 1440 of interrupt state machine 440 then checks at block 1526 whether or not the PE# in the selected IVE 1412 matches the PE# read from the RTE 802 selected by RID 710. If comparator 1440 does not detect a match, an interrupt isolation error is detected, and the process passes to block 1512 and following blocks, which have been described. If, however, comparator 1440 validates the PE# at block 1526, interrupt state machine 440 handles the MSI in accordance with the states of the P field 1424 and Q field 1426 of the selected IVE 1412, as indicated at block 1530-1534. Specifically, if the P field 1424 and Q field 1426 have values of 00, 01, 10 or 11, processing proceeds to FIG. 15B via page connectors A, B, C, or D, respectively.

If P field 1424 and Q field 1426 have values of 00, then following page connector A, interrupt state machine 440 of PHB 120 checks whether or not priority field 1420 is set to 0xFF to designate that the interrupt is disabled. If priority field 1420 is set to indicate that the interrupt is disabled, interrupt state machine 440 set Q field 1426 of IVE 1412 to 1, indicating that an interrupt from the interrupt source corresponding to IVE 1412 is awaiting processing if interrupt processing is enabled (block 1544). Thereafter, processing of the MSI by PHB 120 ends at block 1560.

Returning to block 1540, if interrupt state machine 440 determines that priority field 1420 is set to indicate that the interrupt is enabled (i.e., has a value other than 0xFF), interrupt state machine 440 set P field 1424 of IVE 1412 to 1 (block 1542). In addition, interrupt state machine 440 presents to the interrupt presentation layer an interrupt packet including the priority field 1420 and server number field 1422 from the selected IVE 1412 and an interrupt source number 1407 comprising bits 19:4 of IVE offset 1406. Thereafter, interrupt processing by PHB 120 ends at block 1560.

If P field 1424 and Q field 1426 have values of 01 or 11, then following page connector B or page connector D, interrupt state machine 440 of PHB 120 drops the interrupt because a previous interrupt from the same interrupt source is already queued, as indicated by Q field 1426 (block 1550). Interrupt processing by PHB 120 thereafter ends at block 1560.

If P field 1424 and Q field 1426 have values of 10, then following page connector C, interrupt state machine 440 sets Q field 1426 to 1 in IVE 1412 to indicate the queuing of the interrupt for processing by the interrupt presentation layer. Thereafter, interrupt processing by PHB 120 ends at block 1560.

Figure 16A:
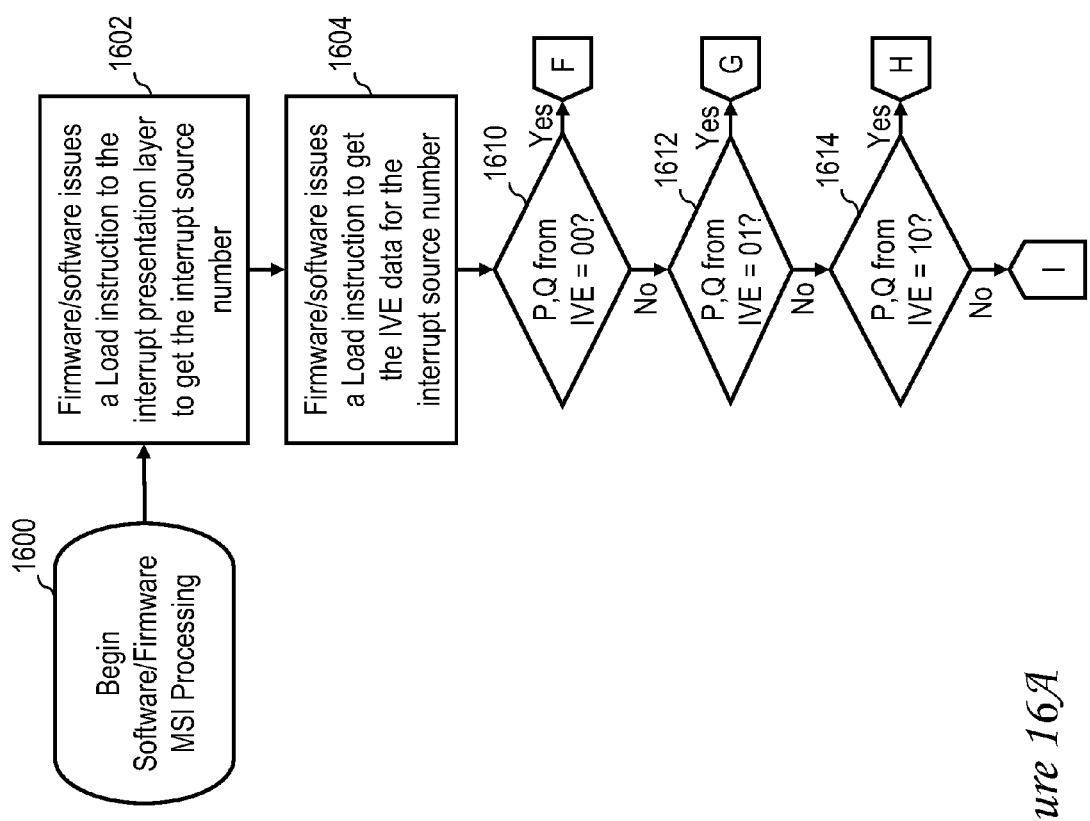
FIGS. 16A-16B together form a high level logical flowchart of an exemplary process by which software or firmware processes a message signaled interrupt (MSI) in accordance with one embodiment.
Figure 16B:
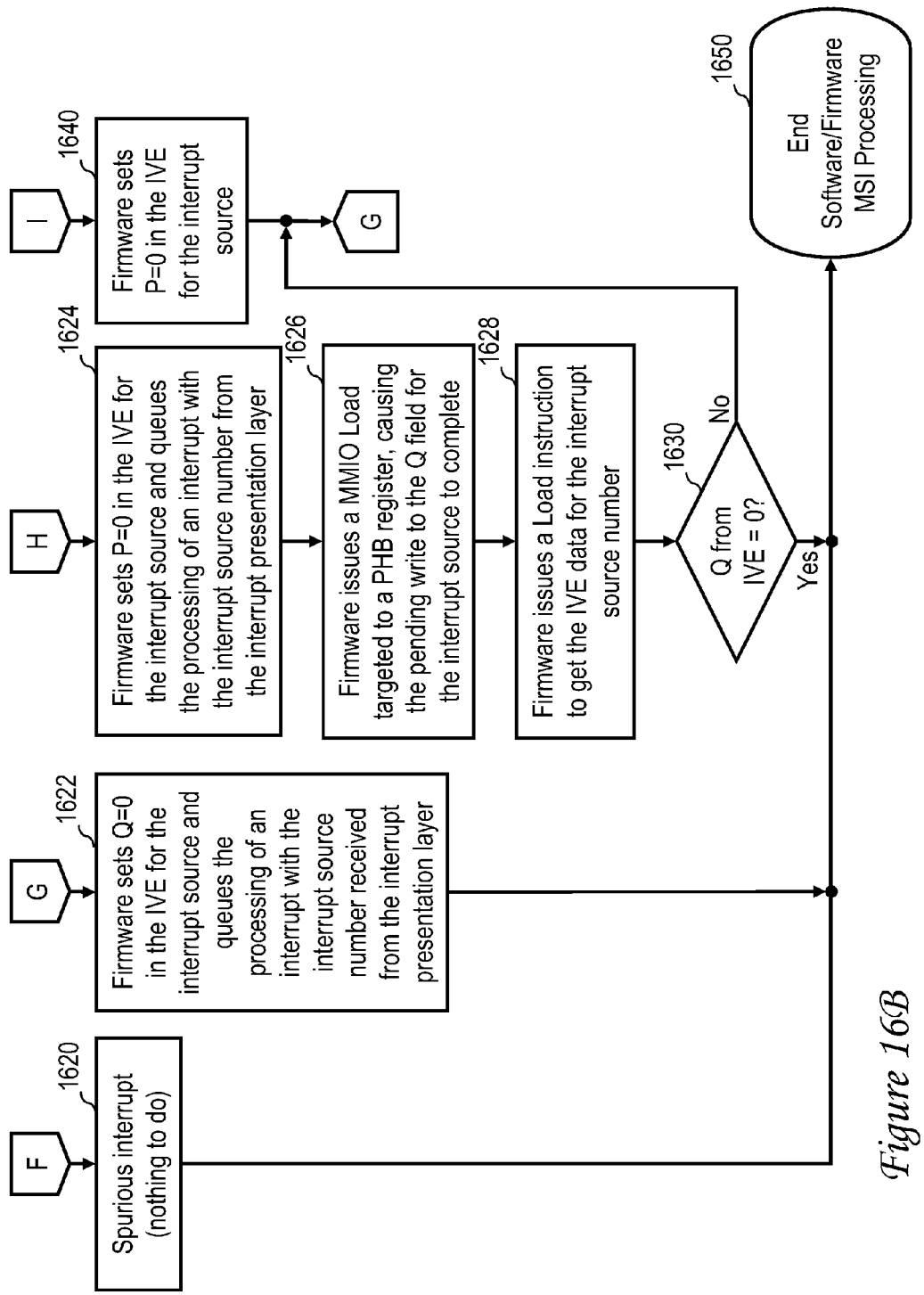

Referring now to FIGS. 16A-16B, there is depicted a high level logical flowchart of an exemplary process by which firmware and/or software of a LPAR 210 processes an interrupt in accordance with one embodiment. The process begins at block 1600 of FIG. 16A and then proceeds to block 1602, which depicts firmware or software issuing a Load instruction to the interrupt presentation layer to retrieve an interrupt source number 1407 from an interrupt packet. Based on interrupt source number 1407, the firmware or software computes an offset into IVT 1410 and issues a Load instruction to read the IVE 1412 for the interrupt source (block 1604). The software or firmware then processes the interrupt in accordance with the values of P field 1424 and Q field 1426 as illustrated as by the process proceeding to FIG. 16B through page connectors F, G, H, or I if the values of P field 1424 and Q field 1426 are 00, 01, 10, or 11, respectively.

If P field 1424 and Q field 1426 have values of 00, processing proceeds from page connector F to block 1620 of FIG. 16B, which depicts software or firmware classifying the interrupt as a spurious interrupt based upon the settings of P field 1424 and Q field 1426. A spurious interrupt can occur, for example, due to timing issues, such as when PHB 120 hardware sends an interrupt and software or firmware clears the interrupt prior to the interrupt being received from PHB 120. Software or firmware ignores spurious interrupt, and the process shown in FIG. 16B ends at block 1650.

If P field 1424 and Q field 1426 have values of 01, software or firmware understands that an interrupt is queued (as indicated by Q field 1426 being set to 1), but no interrupt has yet been presented (as indicated by P field 1424 having a value of 0). Consequently, the process proceeds from page connector G to block 1622, which depicts software or firmware resetting Q field 1426 to 0 in the selected IVE 1412 and queuing the interrupt for processing with the interrupt source number 1407 received from the interrupt presentation layer. The process shown in FIG. 16B thereafter ends at block 1650.

If P field 1424 and Q field 1426 have values of 10, then following page connector H, software or firmware resets P field 1424 to 0 in the selected IVE 1412 and queues an interrupt for processing with the interrupt source number 1407 received from the interrupt presentation layer (block 1624). In addition, the software or firmware issues an MMIO Load targeted to a register in PHB 120, which causes the pending write to the Q field 1426 for the specified interrupt source number 1407 to complete prior to the Load returning the data for the targeted register (block 1626). (A pending write to Q field 1426 would indicate that another interrupt from the same interrupt source had been received while a previous interrupt from that interrupt source is being processed.) The software or firmware also issues a Load instruction at block 1628 to obtain the IVE 1412 for the specified interrupt source number 1407 (block 1628). If Q field 1426 has not yet been reset to 0, then the software or firmware processing of the interrupt proceeds through page connector G to block 1622, which has been described. If, however, Q field 1626 has been reset to 0 to indicate that the interrupt has already been queued, then processing of the interrupt ends at block 1650.

If P field 1424 and Q field 1426 have values of 11, then software or firmware recognizes that multiple instances of the same interrupt have occurred and that it is permissible to ignore the duplicates. Therefore, following page connector I, the software or firmware resets P field 1424 to 0 at block 1640. The process then passes through page connector G to block 1622, which has been described.

Figure 17:
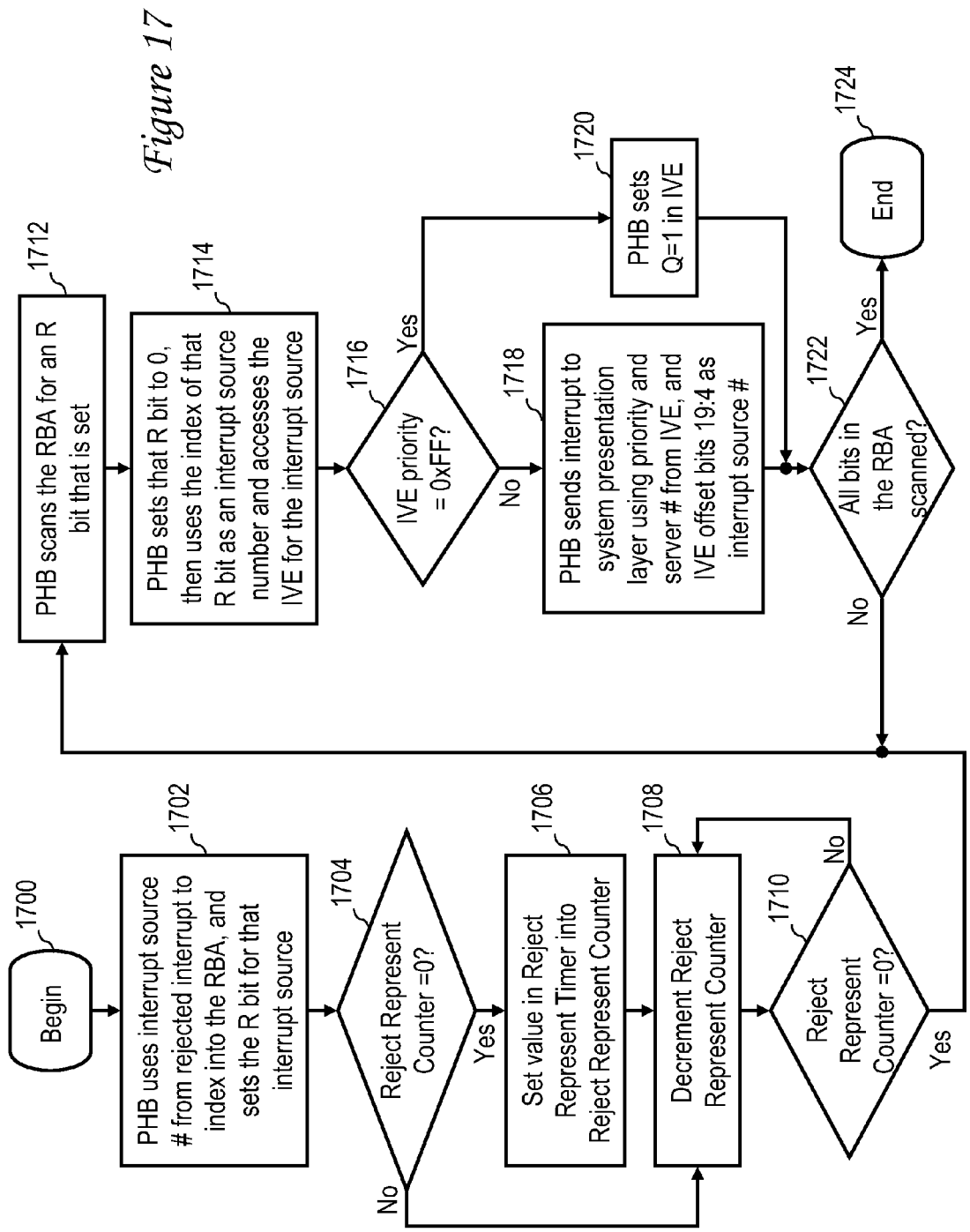
FIG. 17 is a high level logical flowchart of an exemplary process by which an I/O host bridge, such as a PHB, processes a rejected message signaled interrupt (MSI) in accordance with one embodiment.

With reference now to FIG. 17, there is illustrated a high level logical flowchart or an exemplary process by which an I/O host bridge, such as PHB 120, processes interrupts rejected by an interrupt presentation layer in accordance with one embodiment. An interrupt may be rejected, for example, if the software and firmware responsible for servicing the interrupts is not processing interrupts at the rate at that interrupts are being presented. In such cases, rather than dropping the interrupts that cannot be serviced immediately, interrupts are requeued by the I/O host bridge for presentation again at a later time.

The illustrated process begins at 1700 in response to receipt by PHB 120 receiving a rejected interrupt from the interrupt presentation layer, for example, in FITR 404. At block 1702, interrupt state machine 440 of PHB 120 records the rejected interrupt by indexing into Reject Bit Array (RBA) 1450 with the interrupt source number 1407 of the rejected interrupt and setting the bit at that location to a 1. Interrupt state machine 440 also determines at block 1704 if the Reject Represent Counter (RRC) 1456 has a count value of 0. If not, the process proceeds to block 1708, which is described below. However, in response to a determination at block 1704 that RRC 1456 has a count value of 0, interrupt state machine 440 initializes RRC 1456 by placing the value present in Reject Represent Timer (RRT) 1454 into RRC 1456. Thereafter, interrupt state machine 440 decrements RRC 1456 (block 1708) and tests to determine if RRC 1456 has reached a count value of 0 (block 1710). If not, meaning that insufficient time has elapse to re-present the rejected interrupt, the process returns to block 1708, which has been described.

Returning to block 1710, in response to a determination that RRC 1456 has reached a count value of 0, meaning that it is time to re-present a previously rejected interrupt, the process proceeds to block 1712. Block 1712 illustrates interrupt state machine 440 of PHB 120 scanning RBA 1450 beginning at the base address identified by RBA BAR 1452 to identify a bit set to 1, which indicates that an interrupt from the interrupt source represented by that bit has been rejected. At block 1714, interrupt state machine 440 resets the bit detected at block 1712 to 0 and uses the index of that bit as an interrupt source number to access the IVE 1412 associated with the interrupt source. Next, interrupt state machine 440 determines at block 1716 if priority field 1420 in the relevant IVE 1412 indicates that the interrupt is disabled (e.g., has a value 0xFF). If so, interrupt state machine 440 sets Q field 1426 in IVE 1412 to a 1 (block 1720), and the process passes to block 1722, which is described below.

Returning to block 1716, if interrupt state machine 440 determines at block 1716 that priority field 1420 does not indicate that the interrupt is disabled, then interrupt state machine 440 sends the interrupt to the interrupt presentation layer using priority field 1420 and server number field 1422 from IVE 1412, as well as bits 19:4 of IVE offset 1406 as interrupt source number 1407. At block 1722, interrupt state machine 440 determines if all bits in RBA 1450 have been scanned, and thus, all rejected interrupts have been processed. If not, the process depicted in FIG. 17 returns to block 1712, which has been described. If, however, interrupt state machine 440 determines at block 1722 that all rejected interrupts have been processed, the process shown in FIG. 17 ends at block 1724.

As has been described, in one embodiment, a data processing system includes a processor core, a system memory including a first data structure including a plurality of entries mapping requester identifiers (IDs) to partitionable endpoint (PE) numbers, and an input/output (I/O) subsystem including a plurality of PEs each having an associated PE number, where each of the plurality of PEs including one or more requesters each having a respective requester ID. An I/O host bridge, responsive to receiving an I/O message including a requester ID and an address, determines a PE number by reference to a first entry from the first data structure, and responsive to determining the PE number, accesses a second entry of the second data structure utilizing the PE number as an index and validates the address by reference to the accessed entry in the second data structure. The I/O host bridge, responsive to successful validation, provides a service indicated by the I/O message.

In another embodiment, a data processing system includes a processor core, a system memory including a first data structure including entries mapping requester identifiers (IDs) to partitionable endpoint (PE) numbers and a second data structure, and an input/output (I/O) subsystem including an I/O bridge and a plurality of PEs each including one or more requesters each having a respective requester ID. The I/O host bridge, responsive to receiving an I/O message including a requester ID, determines a PE number by reference to a first entry from the first data structure, and responsive to determining the PE number, accesses a second entry of the second data structure utilizing the PE number as an index, where the second entry indicating one or more of the plurality of PEs affected by the message. The I/O host bridge services the I/O message with reference to each of the plurality of PEs indicated by the second entry.

In another embodiment, firmware and/or software is permitted to inject I/O messages, such as DMA messages and interrupt messages, into an I/O host bridge as if the injected interrupts were received from the I/O subsystem.

The foregoing description has been presented for purposes of illustration and elaboration, and is not intended to be exhaustive or limited to the structures and processes disclosed. Many modifications and variations will be apparent to those of ordinary skill in the art. Various embodiments were chosen and described in order to best explain the principles of operation, the practical application, and to enable others of ordinary skill in the art to understand and apply the disclosed teachings in various embodiments with any modifications suitable for the particular use contemplated.

While the present invention has been particularly shown as described with reference to one or more preferred embodiments, it will be understood by those skilled in the art that various changes in form and detail may be made therein without departing from the spirit and scope of the invention. For example, while the present invention has been described in the context of a fully functioning data processing system, those of ordinary skill in the art will appreciate that the processes of the present invention are capable of being distributed in the form of a computer program product including a computer readable storage medium having program code stored therein. Examples of computer readable storage media include hard disk drives, RAM or other volatile memory, non-volatile memory, and optical storage media.

What is claimed is:

1. A method of data processing in a data processing system including a processor core, a system memory coupled to the processor core, and an input/output (I/O) subsystem including an input/output (I/O) host bridge and a plurality of partitionable endpoints (PEs), wherein each of the plurality of PEs includes one or more requesters each assigned a respective one of a plurality of requester identifiers (RIDs), and wherein at least one of the plurality of PEs includes an I/O adapter (I/OA), the method comprising:

the I/O host bridge receiving I/O messages from the processor core in a register, wherein the I/O messages received from the processor core include interrupt messages;

the I/O host bridge receiving I/O messages from the IOA in a buffer, wherein the I/O messages from the processor core and the I/O messages from the IOA each specifies one of the plurality of RIDs assigned within the I/O subsystem and a message body specifying one of a plurality of different I/O message types;

the I/O host bridge forming a stream of I/O messages from those received in the register and the buffer;

the I/O host bridge servicing I/O messages from the stream, wherein the servicing includes servicing the interrupt messages received from the processor core; and prior to receiving a particular I/O message in the stream from the processor core, the particular I/O message comprising an I/O interrupt message, the I/O host bridge previously receiving the particular I/O message from the I/O subsystem and passing the particular I/O message to the processor core.

2. The method of claim 1, wherein forming the stream comprises selecting I/O messages from the register and from the buffer for servicing in accordance with a prioritization scheme.

3. The method of claim 1, wherein:
the I/O host bridge includes a plurality of state machines that each service a respective one of the plurality of different I/O message types; and
the servicing includes determining a type of each of the I/O messages and routing each of the I/O messages to an appropriate one of the plurality of state machines for servicing.

4. The method of claim 3, wherein:
said plurality of different I/O message types includes Direct Memory Access (DMA) messages, I/O error messages and interrupt messages; and
the I/O messages from the processor core include DMA messages.

5. The method of claim 3, wherein:
each of the plurality of partitionable endpoints (PEs) has an associated PE number;
the data processing system includes a data structure including a plurality of entries each associating a respective RID with a PE; and
the method further comprises:
prior to the routing, indexing into the data structure utilizing a RID provided with an I/O message from the processor core to validate authorization of an apparent message source to issue the I/O message.

6. The method of claim 1, wherein:
the register is a memory-mapped register; and
receiving I/O messages from the processor core in the register comprises receiving the I/O messages from the processor core in the memory-mapped register.

* * * * *